United States Patent
Iizawa et al.

(10) Patent No.: US 11,966,151 B2
(45) Date of Patent: Apr. 23, 2024

(54) PHOSPHOR WHEEL

(71) Applicant: Panasonic Intellectual Property Management Co., Ltd., Osaka (JP)

(72) Inventors: Noboru Iizawa, Osaka (JP); Yosuke Honda, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 139 days.

(21) Appl. No.: 17/622,061

(22) PCT Filed: Jul. 8, 2020

(86) PCT No.: PCT/JP2020/026662
§ 371 (c)(1),
(2) Date: Dec. 22, 2021

(87) PCT Pub. No.: WO2021/020056
PCT Pub. Date: Feb. 4, 2021

(65) Prior Publication Data
US 2022/0260241 A1    Aug. 18, 2022

(30) Foreign Application Priority Data

Jul. 26, 2019 (JP) ................. 2019-137647
Oct. 31, 2019 (JP) ................. 2019-198942
Mar. 12, 2020 (JP) ................. 2020-042748

(51) Int. Cl.
*G03B 21/20*   (2006.01)
*G03B 21/16*   (2006.01)

(52) U.S. Cl.
CPC ............ *G03B 21/16* (2013.01); *G03B 21/204* (2013.01)

(58) Field of Classification Search
CPC .............................. G03B 21/16; G03B 21/204
See application file for complete search history.

(56) References Cited

U.S. PATENT DOCUMENTS 7,018,051 B2 *  3/2006  Bok ................ G03B 21/16
                                                  348/743
9,983,467 B2 *  5/2018  Kitade ............. G02B 26/008
                    (Continued)

FOREIGN PATENT DOCUMENTS

JP      2010-073707 A    4/2010
JP         5661947 B2    1/2015
                    (Continued)

OTHER PUBLICATIONS

Extended European Search Report dated Jul. 26, 2022 issued in the corresponding European Patent Application No. 20846909.8.
International Search Report and Written Opinion dated Aug. 18, 2020 in International Patent Application No. PCT/JP2020/026662; with partial English translation.
(Continued)

*Primary Examiner* — Evan P Dzierzynski
(74) *Attorney, Agent, or Firm* — Rimon P.C.

(57) ABSTRACT

A phosphor wheel includes a substrate including a first principal surface and a second principal surface located opposite to each other, a phosphor layer on the first principal surface, and a heat dissipating member disposed so as to oppose one of the first principal surface and the second principal surface. The heat dissipating member includes a projecting portion that projects from a center portion of the heat dissipating member, and the projecting portion includes a contact surface that contacts the one of the first principle surface and the second principle surface. The heat dissipating member further includes fins formed in a peripheral region of the heat dissipating member excluding the center portion. The projecting portion secures a certain distance between the substrate and the heat dissipating member and conducts heat in the substrate to the peripheral region of the heat dissipating member.

22 Claims, 29 Drawing Sheets

(56) References Cited

U.S. PATENT DOCUMENTS

| | | | |
|---|---|---|---|
| 10,520,800 B2* | 12/2019 | Ikeo | G03B 21/204 |
| 2004/0095767 A1* | 5/2004 | Ohmae | H04N 9/3114 |
| | | | 348/E5.143 |
| 2013/0169938 A1* | 7/2013 | Huang | G03B 21/204 |
| | | | 353/31 |
| 2013/0301237 A1 | 11/2013 | Finsterbusch et al. | |
| 2016/0077326 A1* | 3/2016 | Yamagishi | G02B 26/008 |
| | | | 353/61 |
| 2017/0127026 A1* | 5/2017 | Hsu | G03B 21/204 |
| 2017/0261844 A1 | 9/2017 | Kitade et al. | |
| 2017/0293211 A1 | 10/2017 | Kobayashi et al. | |
| 2018/0031207 A1 | 2/2018 | Chang et al. | |
| 2018/0095349 A1 | 4/2018 | Egawa | |
| 2019/0146316 A1 | 5/2019 | Tsai et al. | |
| 2021/0286165 A1 | 9/2021 | Asano | |

FOREIGN PATENT DOCUMENTS

| | | |
|---|---|---|
| JP | 2018-004668 A | 1/2018 |
| JP | 2018-055054 A | 4/2018 |
| JP | 2018-055055 A | 4/2018 |
| JP | 2019-003760 A | 1/2019 |
| WO | 2016/056285 A1 | 4/2016 |
| WO | 2017/154048 A1 | 9/2017 |
| WO | 2018/074125 A1 | 4/2018 |
| WO | 2019/075993 A1 | 4/2019 |

OTHER PUBLICATIONS

Masaki Otsuka, et al., "Creating High Value-added Home Appliance Products Using Biomimicry", Sharp Technical Journal, vol. 105, Jul. 2013, pp. 31-36 with partial English translation.

* cited by examiner

PHOSPHOR WHEEL

CROSS-REFERENCE OF RELATED APPLICATIONS

This application is the U.S. National Phase under 35 U.S.C. § 371 of International Patent Application No. PCT/JP2020/026662, filed on Jul. 8, 2020, which in turn claims the benefit of Japanese Application No. 2019-137647, filed on Jul. 26, 2019, Japanese Application No. 2019-198942, filed on Oct. 31, 2019, and Japanese Application No. 2020-042748, filed on Mar. 12, 2020, the entire disclosures of which Applications are incorporated by reference herein.

TECHNICAL FIELD

The present disclosure relates to a phosphor wheel.

BACKGROUND ART

A phosphor wheel that emits light in response to laser light (pump light) emitted from a laser light source can serve as a light source device used in a laser projector or the like. In order to suppress deterioration of a phosphor wheel caused by heat produced in a phosphor layer upon receiving laser light, the phosphor wheel is rotated about an axis of rotation while the phosphor layer is being irradiated with laser light.

According to one technique disclosed as a technique for improving the heat dissipation performance of a phosphor wheel, fins of a wing-like structure are formed in a clearance space across which two support members each having phosphor provided on its two side surfaces oppose each other (see, for example, Patent Literature (PTL) 1). According to PTL 1, dissipation of heat produced in the phosphor can be accelerated as the air serving as a cooling medium passes through the clearance space, and this can help improve the heat dissipation performance of the phosphor wheel.

CITATION LIST

Patent Literature

PTL 1

Japanese Patent No. 5661947

SUMMARY OF INVENTION

Technical Problem

In recent years, there exists a desire to further increase the heat dissipation performance of phosphor wheels.

The present disclosure provides a phosphor wheel with even more improved heat dissipation performance.

Solution to Problem

To achieve the above, a phosphor wheel according to one aspect of the present disclosure includes: a substrate including a first principal surface and a second principal surface located opposite to each other; a phosphor layer provided on the first principal surface; and a heat dissipating member that is a plate-like member, the heat dissipating member disposed so as to oppose one of the first principal surface and the second principal surface and rotated along with the substrate, wherein the heat dissipating member includes: a projecting portion projecting from a center portion of the heat dissipating member toward the one of the first principal surface and the second principal surface, the projecting portion including a contact surface that makes contact with the one of the first principle surface and the second principle surface; and a plurality of fins formed by cutting and raising a plurality of regions in a peripheral region of the heat dissipating member excluding the center portion, and the projecting portion makes contact with the substrate via the contact surface so as to secure a certain distance between the substrate and the heat dissipating member and conduct heat in the substrate to the peripheral region of the heat dissipating member.

Additionally, to achieve the above, a phosphor wheel according to one aspect of the present disclosure includes: a substrate including a first principal surface and a second principal surface located opposite to each other; a phosphor layer provided on the first principal surface; a heat dissipating member that is a plate-like member, the heat dissipating member disposed so as to oppose the second principal surface and rotated along with the substrate; and one or more clearance retaining members for securing a certain distance between the substrate and the heat dissipating member, wherein the heat dissipating member includes a plurality of fins formed by cutting and raising a plurality of regions in the plate-like member, the plurality of fins are each cut and raised toward the second principal surface, and the one or more clearance retaining members each make contact with the substrate and the heat dissipating member so as to conduct heat in the substrate to the heat dissipating member.

Advantageous Effects of Invention

A phosphor wheel according to the present disclosure can exhibit more improved heat dissipation performance.

DESCRIPTION OF EMBODIMENTS

Figure 1:
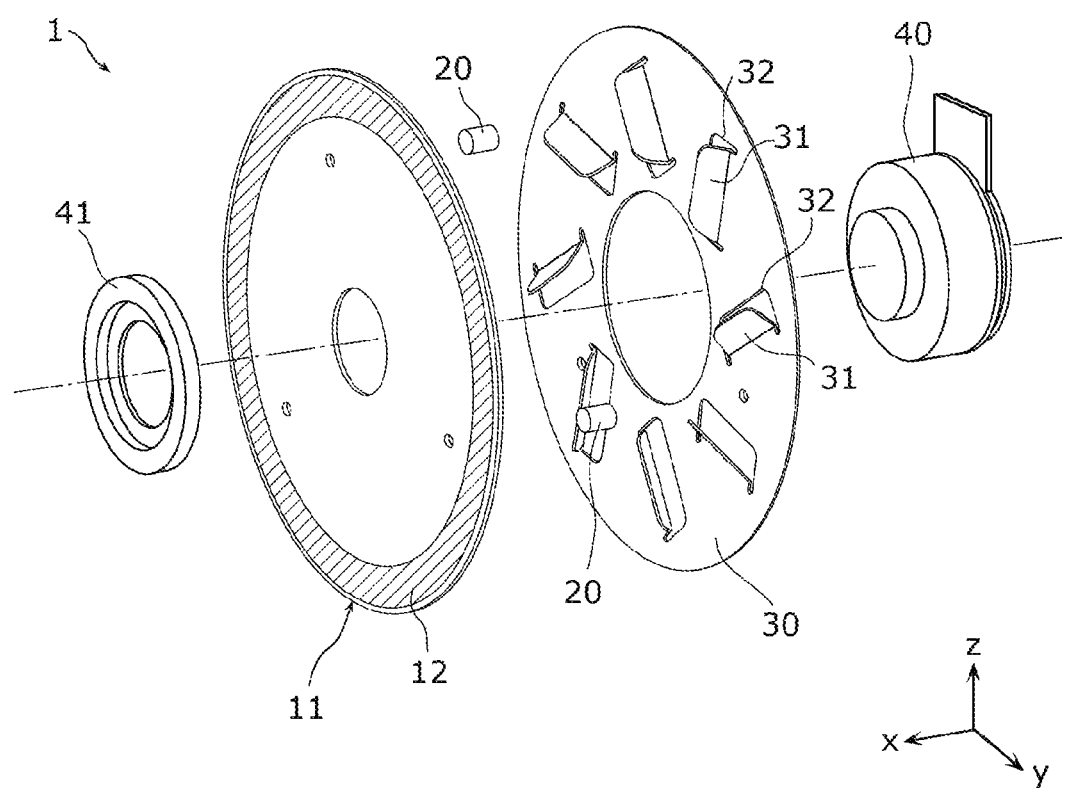
FIG. 1 is an exploded perspective view of a phosphor wheel according to Embodiment 1.

Hereinafter, some embodiments of the present disclosure will be described with reference to the drawings. The embodiments described below merely illustrate specific, preferable examples of the present disclosure. Therefore, the numerical values, the shapes, the materials, the constituent elements, the arrangement positions and the connection modes of the constituent elements, and so on illustrated in the following embodiments are merely examples and are not intended to limit the present disclosure. Hence, among the constituent elements described in the following embodiments, any constituent element that is not described in the independent claims each expressing the broadest concept of the present disclosure will be construed as an optional constituent element.

It is to be noted that the drawings are schematic diagrams and do not necessarily provide the exact depiction. In addition, in the drawings, substantially identical components are given identical reference characters, and duplicate description thereof will be omitted, or description thereof will be simplified.

The drawings referred to in conjunction with the description of the following embodiments may include coordinate axes. The Z-axis direction is regarded as the heightwise direction of a phosphor wheel.

The positive side on the Z-axis may be expressed as the upper side (upward), and the negative side on the Z-axis may be expressed as the lower side (downward). The X-axis direction and the Y-axis direction are orthogonal to each other along a plane perpendicular to the Z-axis direction. According to the following embodiments, a front view shows an object as the object is viewed from the positive side on the X-axis, and a rear view shows an object as the object is viewed from the negative side on the X-axis. Meanwhile, a side view shows an object as the object is viewed in the Y-axis direction.

Embodiment 1

[Phosphor Wheel 1]

Figure 2:
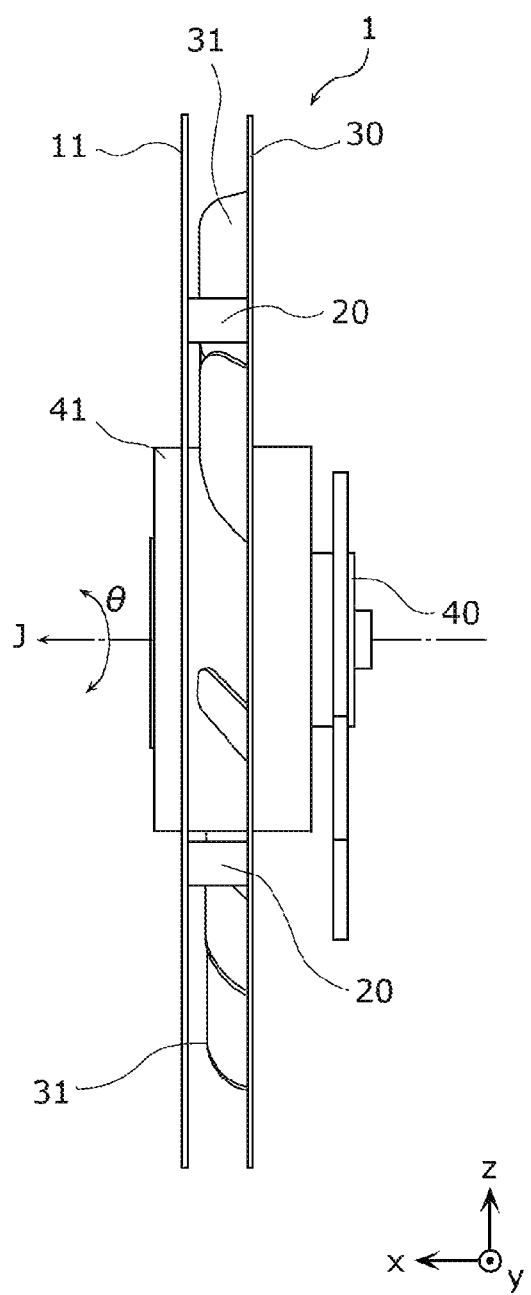
FIG. 2 is a side view of the phosphor wheel according to Embodiment 1.

Now, a configuration of phosphor wheel 1 according to Embodiment 1 will be described with reference to FIG. 1 and FIG. 2. FIG. 1 is an exploded perspective view of phosphor wheel 1 according to Embodiment 1. FIG. 2 is a side view of phosphor wheel 1 according to Embodiment 1.

Phosphor wheel 1 according to Embodiment 1 is a reflective phosphor wheel and is used in, for example but not limited to, a light source of a laser projector, an illumination device for facilities, an endoscope, or the like. As illustrated in FIG. 1 and FIG. 2, phosphor wheel 1 includes substrate 11, phosphor layer 12 provided on substrate 11, clearance retaining members 20, heat dissipating member 30, motor 40, and adjusting plate 41. In this example, adjusting plate 41 is used to transmit rotary power of motor 40 to substrate 11 and so on in a well-balanced manner but is not an essential component. Adjusting plate 41 may be a hub of motor 40.

[Substrate 11]

Figure 3:
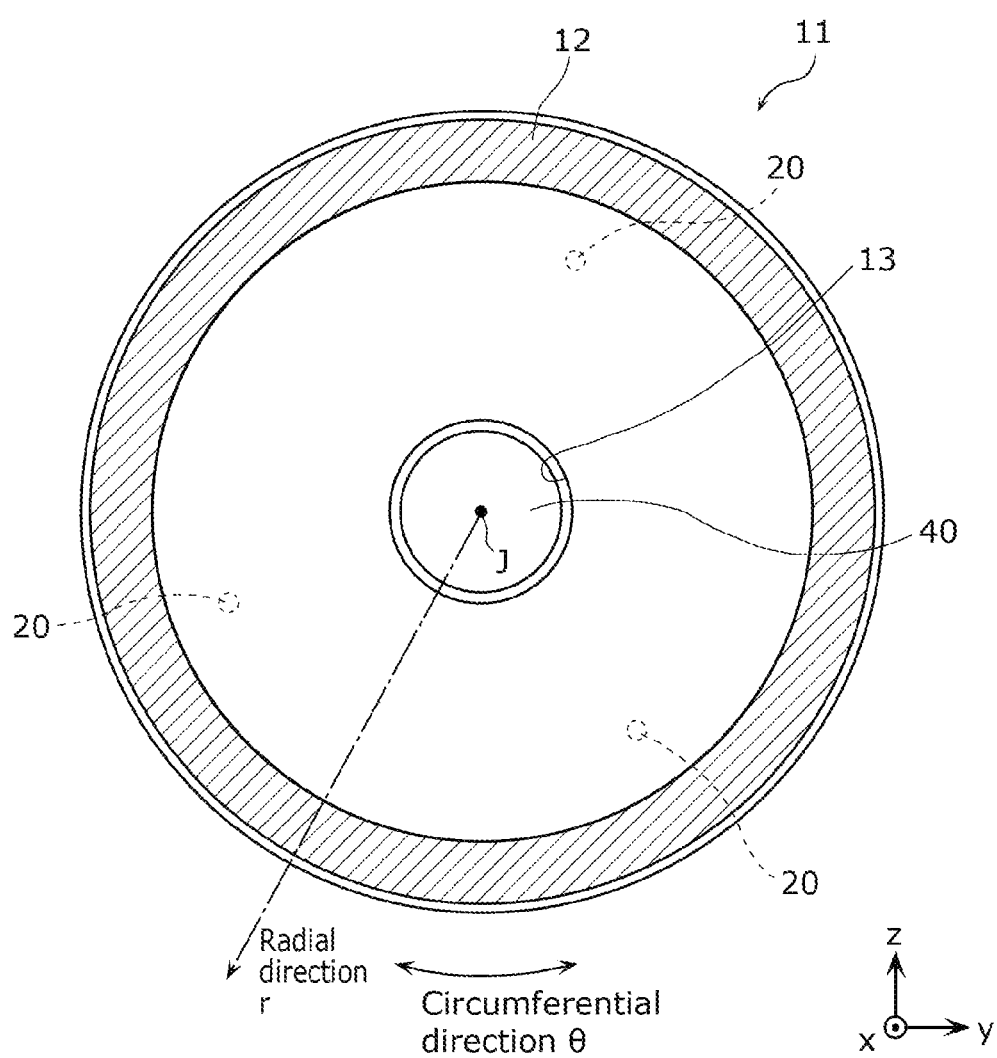
FIG. 3 is a front view of a substrate according to Embodiment 1, as viewed toward the first principal surface.

FIG. 3 is a front view of substrate 11 according to Embodiment 1, as viewed toward the first principal surface.

Substrate 11 has a first principal surface and a second principal surface located opposite to each other. Substrate 11 is a disc-shaped plate-like member that is driven by motor 40 so as to rotate about axis of rotation J. In other words, substrate 11 has a circular shape as viewed in plan view. In this example, a shape as viewed in plan view is a shape of an object as the object is viewed in the direction perpendicular to substrate 11 (from the positive side on the X-axis) (i.e., a front-view shape). Substrate 11 has a diameter of about 8 cm, for example, but there is no particular limitation on the diameter of substrate 11.

As illustrated in FIG. 3, in substrate 11, phosphor layer 12 is provided on the first principal surface, and clearance retaining members 20 are in contact with the second principal surface. Opening 13 is provided at the center of substrate 11, and a portion (a hub, a rotor, or the like) of motor 40 to be coupled to adjusting plate 41 is to project through opening 13. Axis of rotation J passes through the center (the center position) of substrate 11, and substrate 11 is driven by motor 40 to as to rotate about axis of rotation J.

There is no particular limitation on the material of substrate 11, and any metal with high thermal conductivity, such as aluminum, stainless steel, or sapphire, can be used. Substrate 11 according to the present embodiment is formed of aluminum, for example. Aluminum has relatively high thermal conductivity and is lightweight. Therefore, when substrate 11 is formed of aluminum, not only can the heat dissipation performance of the phosphor wheel be increased, but the weight of the phosphor wheel can also be reduced. Substrate 11 has a thickness of, for example, 1.5 mm or less.

[Phosphor Layer 12]

Phosphor layer 12 is provided on the first principal surface of substrate 11.

In this example, phosphor layer 12 may be made of a resin material including a large number of yttrium aluminum garnet (YAG)-based yellow phosphor particles, for example. In this case, the base material of this resin material is a silicone resin having a light transmissive property and a thermosetting property, for example. Such a resin material can be screen printed on the first principal surface of substrate 11 and then thermally set in a heating furnace, and thus phosphor layer 12 can be provided on the first principal surface of substrate 11.

Alternatively, phosphor layer 12 may be composed of YAG-based yellow phosphor particles and a binder, for example. In this case, in order to achieve higher light conversion efficiency, phosphor layer 12 preferably includes the YAG-based yellow phosphor particles in a larger amount as they contribute to the conversion of pump light into fluorescence. In other words, in phosphor layer 12, the content by percentage of the phosphor particles is preferably higher than the content by percentage of the binder. The binder is a mixture of other than the yellow phosphor particles constituting phosphor layer 12. The binder is made of an inorganic substance having high thermal conductivity, such as alumina, for example. The thermal conductivity of alumina is ten times or higher of the thermal conductivity of silicone resins. Therefore, when phosphor layer 12 is composed of yellow phosphor particles and a binder made of alumina, this can help achieve high thermal conductivity.

Although not illustrated in FIG. 1 to FIG. 3, a reflective film may be provided between the first principal surface of substrate 11 and phosphor layer 12.

According to the present embodiment, as illustrated in FIG. 3, phosphor layer 12 is provided in a ring shape (an annular shape) as viewed in plan view with phosphor layer 12 formed in a belt shape extending in circumferential direction θ of disc-shaped substrate 11. To be more specific, phosphor layer 12 is provided in a ring shape (an annular shape) along a circumference that is at an equal distance from axis of rotation J serving as the center of rotation of phosphor wheel 1. In other words, the width of phosphor layer 12 in radial direction r is constant. Moreover, phosphor layer 12 is desirably provided along the periphery of the first principal surface. Even in a case where substrate 11 is not a disc-shaped substrate, phosphor layer 12 is preferably provided in an annular shape.

Phosphor layer 12 emits light upon irradiated with laser light. At this point, in order to keep the laser light from concentratedly hitting one point on phosphor layer 12, phosphor wheel 1 is rotated by motor 40 about axis of rotation J while phosphor layer 12 is being irradiated with laser light. This configuration can suppress deterioration of phosphor particles included in phosphor layer 12 that could deteriorate due to the heat produced in response to laser light irradiation.

[Clearance Retaining Members 20]

Figure 4:
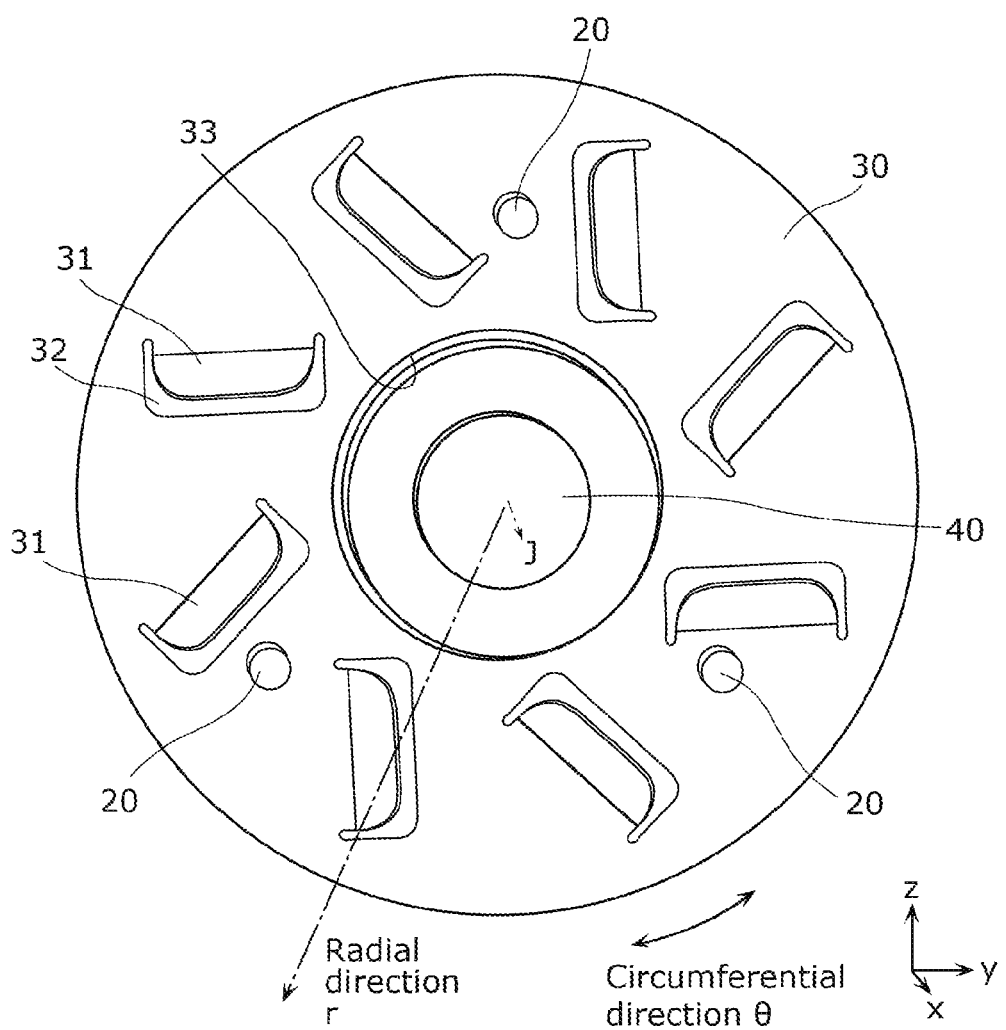
FIG. 4 is a perspective view of a heat dissipating member and clearance retaining members according to Embodiment 1, as viewed toward the first principal surface.

FIG. 4 is a perspective view of clearance retaining members 20 and heat dissipating member 30 according to Embodiment 1, as viewed toward the first principal surface.

One or more clearance retaining members 20 are disposed so as to secure a certain distance between substrate 11 and heat dissipating member 30. In other words, one or more clearance retaining members 20 are disposed between substrate 11 and heat dissipating member 30 so as to keep the distance between substrate 11 and heat dissipating member 30 constant. Each of the one or more clearance retaining members is in contact with substrate 11 and heat dissipating member 30 so as to conduct the heat in substrate 11 to heat dissipating member 30.

According to the present embodiment, three clearance retaining members 20 are disposed at their respective positions so as to keep the distance between substrate 11 and heat dissipating member 30 constant. It suffices that the thickness of each clearance retaining member 20, that is, the distance between substrate 11 and heat dissipating member 30 be no less than the height of a plurality of fins 31 formed by cutting and raising heat dissipating member 30, which will be described later. Although there is no particular limitation on the material for forming clearance retaining members 20, in this example, the material for forming clearance retaining members 20 may be, for example but not limited to, stainless steel, iron, copper, or aluminum.

For example, as illustrated in FIG. 1 to FIG. 4, in one example, clearance retaining members 20 are disposed at positions that are inward from phosphor layer 12 and lie at substantially regular intervals in circumferential direction θ. With this configuration, clearance retaining members 20 function not only as spacers that can form an air gap (a space) filled with air of a certain distance between substrate 11 and heat dissipating member 30 but also as a path for heat conduction via which the heat produced in phosphor layer 12 can be transmitted from substrate 11 to heat dissipating member 30.

[Heat Dissipating Member 30]

Heat dissipating member 30 is a plate-like member that is disposed so as to oppose the second principal surface of substrate 11 and rotated along with substrate 11. Heat dissipating member 30 includes a plurality of fins 31 formed by cutting a plurality of regions 32 in the plate-like member and raising the cut plurality of regions 32 toward the second principal surface.

Figure 5:
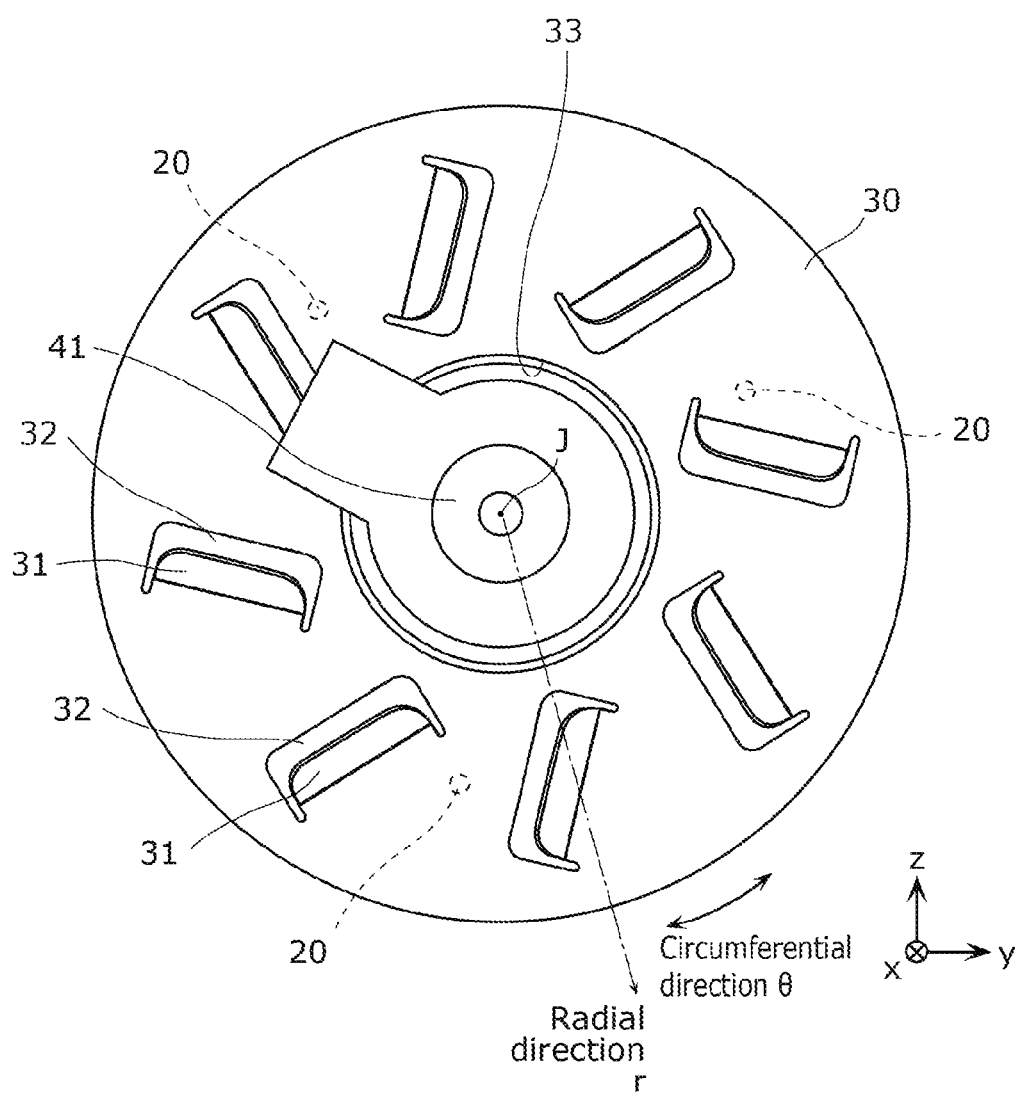
FIG. 5 is a rear view of the heat dissipating member according to Embodiment 1, as viewed toward the second principal surface.

FIG. 5 is a rear view of heat dissipating member 30 according to Embodiment 1, as viewed toward the second principal surface. In this example, a rear view is a plan view that shows heat dissipating member 30 as it is viewed toward its surface opposite to the surface (the front surface) facing the second principal surface of substrate 11 and is viewed in the direction perpendicular to heat dissipating member 30 (i.e., from the negative side on the X-axis).

Heat dissipating member 30 is a disc-shaped plate-like member that is driven by motor 40 so as to rotate about axis of rotation J. In other words, heat dissipating member 30 has a circular shape as viewed in plan view. In this example, heat dissipating member 30 has a diameter of about 8 cm, for example, but there is no particular limitation on the diameter of heat dissipating member 30 as long as this diameter is about the same as or smaller than the diameter of substrate 11.

As illustrated in FIG. 4, heat dissipating member 30 is in contact with clearance retaining members 20 at the front surface of heat dissipating member 30, that is, at the surface of heat dissipating member 30 where heat dissipating member 30 opposes the second principal surface of substrate 11. As illustrated in FIG. 4 and FIG. 5, a plurality of fins 31 are formed in heat dissipating member 30. To be more specific, heat dissipating member 30 includes the plurality of fins 31 that are formed by cutting and raising a plurality of regions 32 that are a plurality of partial regions in the plate-like member. In this example, the plurality of regions 32 serve as through-holes after the plurality of fins 31 have been formed.

Opening 33 is provided at the center of heat dissipating member 30, and motor 40 is connected to adjusting plate 41 and so on via opening 33. Axis of rotation J passes through the center (the center position) of heat dissipating member 30, and heat dissipating member 30, along with substrate 11, is driven by motor 40 so as to rotate about axis of rotation J. It suffices that opening 33 have a size (a diameter) that is sufficient to allow a part of motor 40 that is to be connected to adjusting plate 41 to pass therethrough. For example, it suffices that opening 33 have a size that allows a gap of 1 mm or so to be present between the edge of opening 33 and the part of motor 40.

Although there is no particular limitation on the material of heat dissipating member 30, heat dissipating member 30 may be formed, for example, of a plate-like member made of metal, such as stainless steel, iron, copper, sapphire, or aluminum.

Now, the plurality of fins 31 and the plurality of regions 32 will be described in detail.

<Fins 31>

Each fin 31 is formed by cutting region 32 that is a partial region in the plate-like member of heat dissipating member 30 and by raising cut region 32 toward the second principal surface of substrate 11. In other words, the plurality of fins 31 are erected toward the second principal surface of substrate 11 as the plurality of regions 32 are cut and raised toward the second principal surface of substrate 11.

For example, as illustrated in FIG. 4 and FIG. 5, the plurality of fins 31 are located annularly in circumferential direction θ at a certain distance from the center (axis of rotation J). For example, the plurality of fins 31 each have a substantially rectangular shape (a substantially trapezoidal shape), and the corners at their leading end portions may each be cut off into a round shape. As can be seen in the example illustrated in FIG. 4 and FIG. 5, the plurality of fins 31 are formed so as to extend at a certain angle relative to radial direction r and are cut and raised so as to extend at a certain angle relative to the second principal surface of substrate 11 (or relative to the front surface of the heat dissipating member). In other words, the plurality of fins 31 do not have to be formed to align with radial direction r or do not have to be erected perpendicular to the second principal surface of substrate 11 (or to the front surface of heat dissipating member 30).

Figure 6:
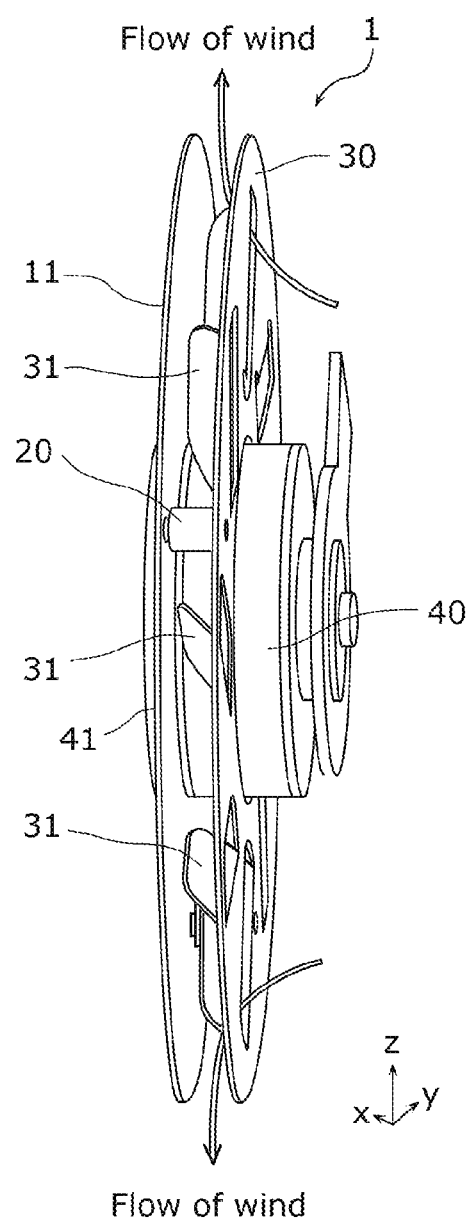
FIG. 6 is a perspective view showing, as viewed from a side, the flow of a wind produced in the phosphor wheel according to Embodiment 1.

FIG. 6 is a perspective view showing, as viewed from a side, the flow of a wind produced in the phosphor wheel according to Embodiment 1.

As illustrated in FIG. 6, in response to the rotation of heat dissipating member 30, the plurality of fins 31 each blow the wind outward from each fin 31 (in the centrifugal direction) with axis of rotation J at the center. In other words, the plurality of fins 31 each send the air (the fluid) present in the rear side of heat dissipating member 30 (in the negative side on the X-axis) toward the outer side of the space between substrate 11 and heat dissipating member 30 via the plurality of regions 32 serving as the through-holes. This configuration makes it possible to use the wind formed by the flow of the air produced by the plurality of fins 31 (the airflow) to cool phosphor layer 12.

In this example, the angle of each fin 31 relative to radial direction r and the angle of each fin 31 relative to the second principal surface are not limited to the example illustrated in FIG. 4 and FIG. 5 and can each be set to any angle that allows the wind to be sent outward effectively.

<Regions 32>

As described above, regions 32 are partial regions in the plate-like member of heat dissipating member 30 and serve as through-holes after the plurality of fins 31 have been formed.

To be more specific, the plurality of regions 32 are similar in shape. Moreover, as viewed toward the first principal surface of substrate 11, the plurality of regions 32 are located at positions along respective virtual straight lines that each extend at a predetermined angle or greater relative to the radial direction from positions that are spaced apart from the center of heat dissipating member 30 by a predetermined distance and lie at substantially regular intervals in circumferential direction θ.

As illustrated in FIG. 4 and FIG. 5, the plurality of regions 32 serve as through-holes penetrating heat dissipating member 30 and function as vent holes through which the wind produced by the plurality of fins 31 passes. The plurality of regions 32 are located annularly in circumferential direction θ at a certain distance from the center of heat dissipating member 30 (axis of rotation J). If the plurality of regions 32 are disposed randomly, this makes the rotation of heat dissipating member 30 unstable, causing strange sounds or the like. Therefore, the plurality of regions 32 are disposed at substantially regular intervals. For example, the plurality of regions 32 each have a substantially rectangular shape (a substantially trapezoidal shape), and their corners may each be cut off to a round shape.

In the example illustrated in FIG. 4 and FIG. 5, the plurality of regions 32 are each formed so as to extend at a certain angle relative to radial direction r. In other words, the plurality of regions 32 do not have to be formed to align with radial direction r. It suffices that the size of the angle of the plurality of regions 32 relative to radial direction r be determined such that the cut and raised plurality of fins 31 can effectively send the wind outward, and the example illustrated in FIG. 4 and FIG. 5 is not a limiting example.

[Motor 40]

As illustrated in FIG. 5, for example, motor 40 is controlled by an electronic circuit (not illustrated) so as to rotate and drive substrate 11 and heat dissipating member 30. Motor 40 is, for example, an outer rotor motor, but there is no particular limitation on the type of motor 40.

[Advantageous Effects and Others]

As described above, phosphor wheel 1 includes substrate 11, phosphor layer 12, heat dissipating member 30, and one or more clearance retaining members 20. Substrate 11 includes the first principal surface and the second principal surface located opposite to each other. Phosphor layer 12 is provided on the first principal surface. Heat dissipating member 30 is formed by a plate-like member. Heat dissipating member 30 is disposed so as to oppose the second principal surface and is rotated along with substrate 11. One or more clearance retaining members 20 serve to secure a certain distance between substrate 11 and heat dissipating member 30. Heat dissipating member 30 includes a plurality of fins formed by cutting and raising a plurality of regions in the plate-like member, and the plurality of fins are each cut and raised toward the second principal surface. One or more clearance retaining members 20 make contact with substrate 11 and heat dissipating member 30 so as to conduct the heat in substrate 11 to the heat dissipating member.

In this manner, phosphor wheel 1 is a reflective phosphor wheel and includes phosphor layer 12 only on the first principal surface of substrate 11. Moreover, phosphor wheel 1 includes clearance retaining members 20, and this can create a space of a certain distance between substrate 11 and heat dissipating member 30. With this configuration, the wind produced by the plurality of fins 31 can be sent toward the outside of the space between substrate 11 and heat dissipating member 30 via the plurality of regions 32 (the through-holes). In other words, the wind produced by the plurality of fins 31 can be used to cool phosphor layer 12. Accordingly, the heat dissipation performance of phosphor wheel 1 can be improved. Moreover, phosphor wheel 1 includes clearance retaining members 20, and this can create a path for heat conduction of transmitting the heat produced in phosphor layer 12 from substrate 11 to heat dissipating member 30. Thus, the heat dissipation performance can be further improved.

With the configuration described above, phosphor wheel 1 with more improved heat dissipation performance can be achieved.

Furthermore, the plurality of fins formed in heat dissipating member 30 are formed by cutting and raising the plurality of regions in the plate-like member and can thus be formed in a simple manner. Therefore, the cost can be reduced as compared to the case where the plurality of fins are manufactured through machining.

The foregoing description has indicated that it suffices that opening 33 formed at the center of heat dissipating member 30 have a size that is sufficient to allow a part of motor 40 to pass therethrough to be coupled to adjusting plate 41, but this is not a limiting example. Opening 33 may have a greater size to be used for ventilation. In other words, heat dissipating member 30 may include opening 33 formed for ventilation at the center portion of heat dissipating member 30, and axis of rotation J of heat dissipating member 30 that is rotated along with substrate 11 may pass through opening 33.

With this configuration, the wind produced by the plurality of fins 31 can be sent toward the outside of the space (the air gap) between substrate 11 and heat dissipating member 30 not only via the plurality of regions 32 (the through-holes) but also via opening 33. Accordingly, the amount of the wind that passes through the space between substrate 11 and heat dissipating member 30 and that can be used to cool phosphor layer 12 can be increased, and this can help further improve the heat dissipation performance of phosphor wheel 1.

The configuration of phosphor wheel 1 is not limited to the mode described above. In order to further improve the heat dissipation performance, fins may be formed in substrate 11, or an opening serving as a through-hole may be formed in substrate 11. The shape of each clearance retaining member 20 included in phosphor wheel 1 is not limited to the mode described above. Therefore, some configurations of substrate 11 for further improving the heat dissipation performance will be described below as Variation 1 to Variation 3, and other modes of the shape of clearance retaining members 20 will be described below as Variation 4 and Variation 5.

[Variation 1]

In the case described according to Variation 1, in order to further improve the heat dissipation performance, fins are formed further in substrate 11 constituting phosphor wheel 1.

Figure 7:
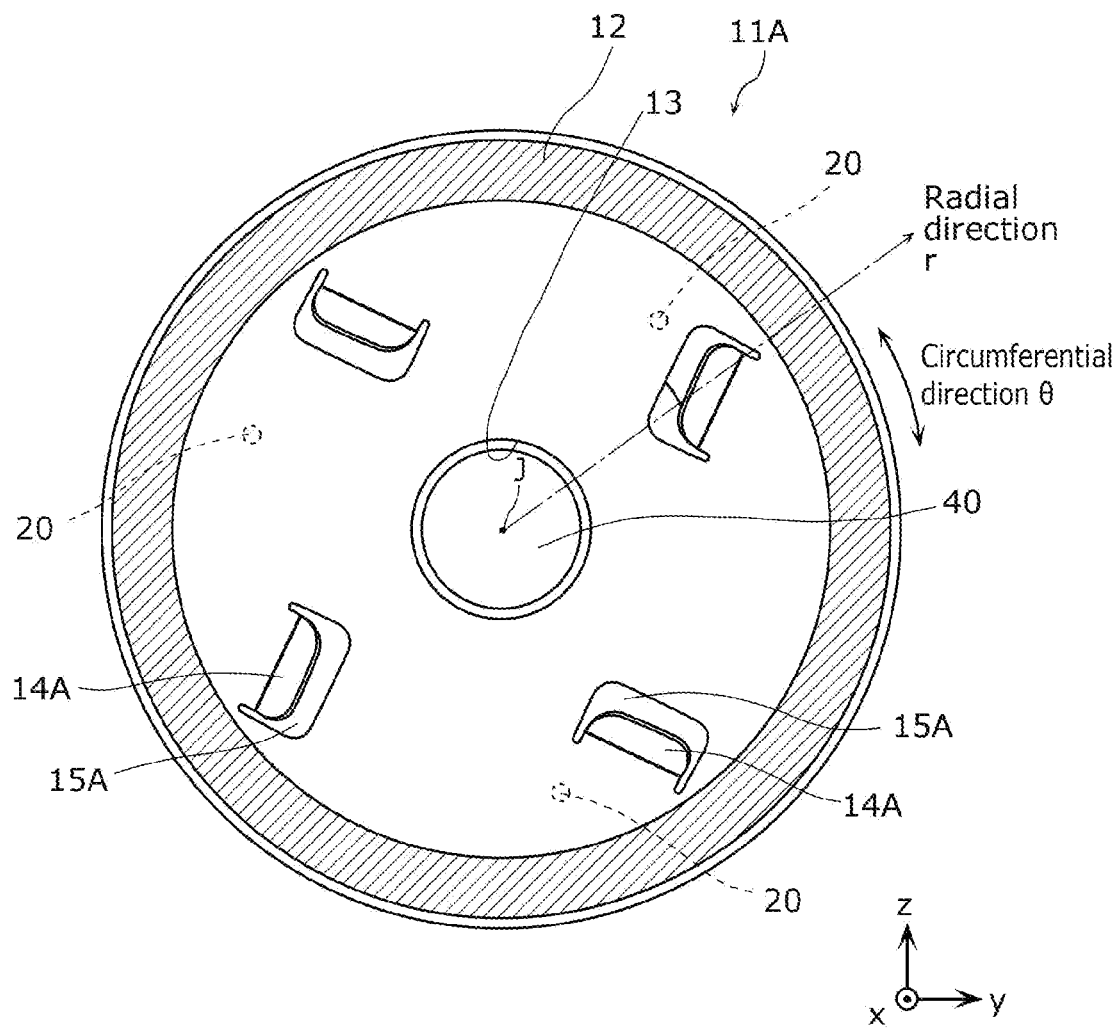
FIG. 7 is a front view of a substrate according to Variation 1 of Embodiment 1, as viewed toward the first principal surface.

FIG. 7 is a front view of substrate 11A according to Variation 1 of Embodiment 1, as viewed toward the first principal surface. Elements that are similar to those illustrated in FIG. 3 are given identical reference characters, and detailed description thereof will be omitted.

Substrate 11A illustrated in FIG. 7 differs in terms of the configuration from substrate 11 according to Embodiment 1 in that substrate 11A includes a plurality of substrate-side fins 14A. The following description centers on the differences from Embodiment 1.

[Substrate 11A]

Substrate 11A further includes one or more substrate-side fins 14A formed by cutting and raising a part of the region of substrate 11A where phosphor layer 12 is not provided.

To be more specific, as illustrated in FIG. 7, as compared to substrate 11, substrate 11A may further include a plurality of substrate-side fins 14A formed by cutting a plurality of regions 15A in the plate-like member and raising the cut plurality of regions 15A toward heat dissipating member 30. In other words, substrate 11A includes the plurality of substrate-side fins 14A formed as the plurality of regions 15A that are a plurality of partial regions in the plate-like member where phosphor layer 12 is not provided are cut and raised. In this example, the plurality of regions 15A serve as through-holes after the plurality of substrate-side fins 14A have been formed.

Now, the plurality of substrate-side fins 14A and the plurality of regions 15A will be described in detail.

<Substrate-Side Fins 14A>

Each substrate-side fin 14A is formed by cutting region 15A that is a partial region in the plate-like member of substrate 11A where phosphor layer 12 is not provided and by raising cut region 15A toward one of the surfaces of heat dissipating member 30 where heat dissipating member 30 opposes the second principal surface. In other words, the plurality of substrate-side fins 14A are erected toward heat dissipating member 30 as the plurality of regions 15A are cut and raised toward heat dissipating member 30. Moreover, the plurality of substrate-side fins 14A are formed at positions where the plurality of substrate-side fins 14A do not overlap the plurality of fins 31 in heat dissipating member 30. In other words, one or more substrate-side fins 14A and one or more fins 31 formed in heat dissipating member 30 are formed at positions where one or more substrate-side fins 14A and one or more fins 31 do not overlap each other as viewed in the direction in which substrate 11A and heat dissipating member 30 overlap each other.

For example, as illustrated in FIG. 7, the plurality of substrate-side fins 14A are located annularly in circumferential direction θ at a certain distance from the center of substrate 11A (axis of rotation J). For example, the plurality of substrate-side fins 14A each have a substantially rectangular shape (a substantially trapezoidal shape), and the corners at their leading end portions may each be cut off to a round shape. In the example illustrated in FIG. 7, the plurality of substrate-side fins 14A are each formed so as to extent at a certain angle relative to radial direction r and are each cut and raised so as to extend at a certain angle relative to heat dissipating member 30. In other words, the plurality of substrate-side fins 14A do not have to be formed to align with radial direction r or do not have to be erected perpendicular to the second principal surface of substrate 11.

The angle of each substrate-side fin 14A relative to radial direction r and the angle of each substrate-side fin 14A relative to the second principal surface are not limited to the example illustrated in FIG. 7 and can each be set to any angle that allows the air to be sent outward effectively.

Moreover, the direction in which each substrate-side fin 14A is cut and raised according to the present variation is an example, and each substrate-side fin 14A may be cut and raised so as to be erected on the first principal surface.

<Regions 15A>

As described above, each region 15A is a partial region in the plate-like member of substrate 11A and is a partial region where phosphor layer 12 is not provided. Each region 15A serves as a through-hole after the plurality of substrate-side fins 14A have been formed.

To be more specific, the plurality of regions 15A are similar in shape. Moreover, as viewed in plan view, the plurality of regions 15A where the plurality of substrate-side fins 14A have been formed are located at positions along respective virtual straight lines that each extend at a predetermined angle or greater relative to radial direction r from positions that are spaced apart from the center of substrate 11A by a predetermined distance and lie at substantially regular intervals in circumferential direction θ. Moreover, the plurality of regions 15A are located at positions where the plurality of regions 15A do not overlap regions 32 of heat dissipating member 30.

As illustrated in FIG. 7, the plurality of regions 15A serve as through-holes penetrating substrate 11A and function as vent holes through which the wind produced by the plurality of substrate-side fins 14A passes.

Moreover, as illustrated in FIG. 7, the plurality of regions 15A are located annularly in circumferential direction θ at a certain distance from the center of substrate 11A (axis of rotation J). For example, the plurality of regions 15A each have a substantially rectangular shape (a substantially trapezoidal shape), and their corners may each be cut off to a round shape.

In the example illustrated in FIG. 7, the plurality of regions 15A are formed so as to extend at a certain angle relative to radial direction r. In other words, the plurality of regions 15A do not have to be formed to align with radial direction r.

As with substrate-side fins 14A, the angle of the plurality of regions 15A relative to radial direction r is not limited to the example illustrated in FIG. 7.

[Advantageous Effects and Others]

As described above, in phosphor wheel 1 according to the present variation, substrate 11A further includes one or more substrate-side fins 14A formed by cutting and raising a part of a region of substrate 11A where phosphor layer 12 is not provided. One or more substrate-side fins 14A are each cut and raised toward one of the surfaces of heat dissipating member 30 where heat dissipating member 30 opposes the second principal surface. One or more substrate-side fins 14A and one or more fins 31 formed in heat dissipating member 30 are formed at positions where one or more substrate-side fins 14A and one or more fins 31 do not overlap each other as viewed in the direction in which substrate 11A and heat dissipating member 30 overlap each other.

With this configuration, the wind produced by the plurality of substrate-side fins 14A can be sent toward the outside of the space between substrate 11A and heat dissipating member 30 via the plurality of regions 15A (the through-holes). Accordingly, the wind produced by the plurality of substrate-side fins 14A can be used additionally to cool phosphor layer 12, and this can help further improve the heat dissipation performance of phosphor wheel 1.

[Variation 2]

In the case described according to Variation 2, in order to further improve the heat dissipation performance, openings serving as through-holes are formed in the substrate constituting phosphor wheel 1.

Figure 8:
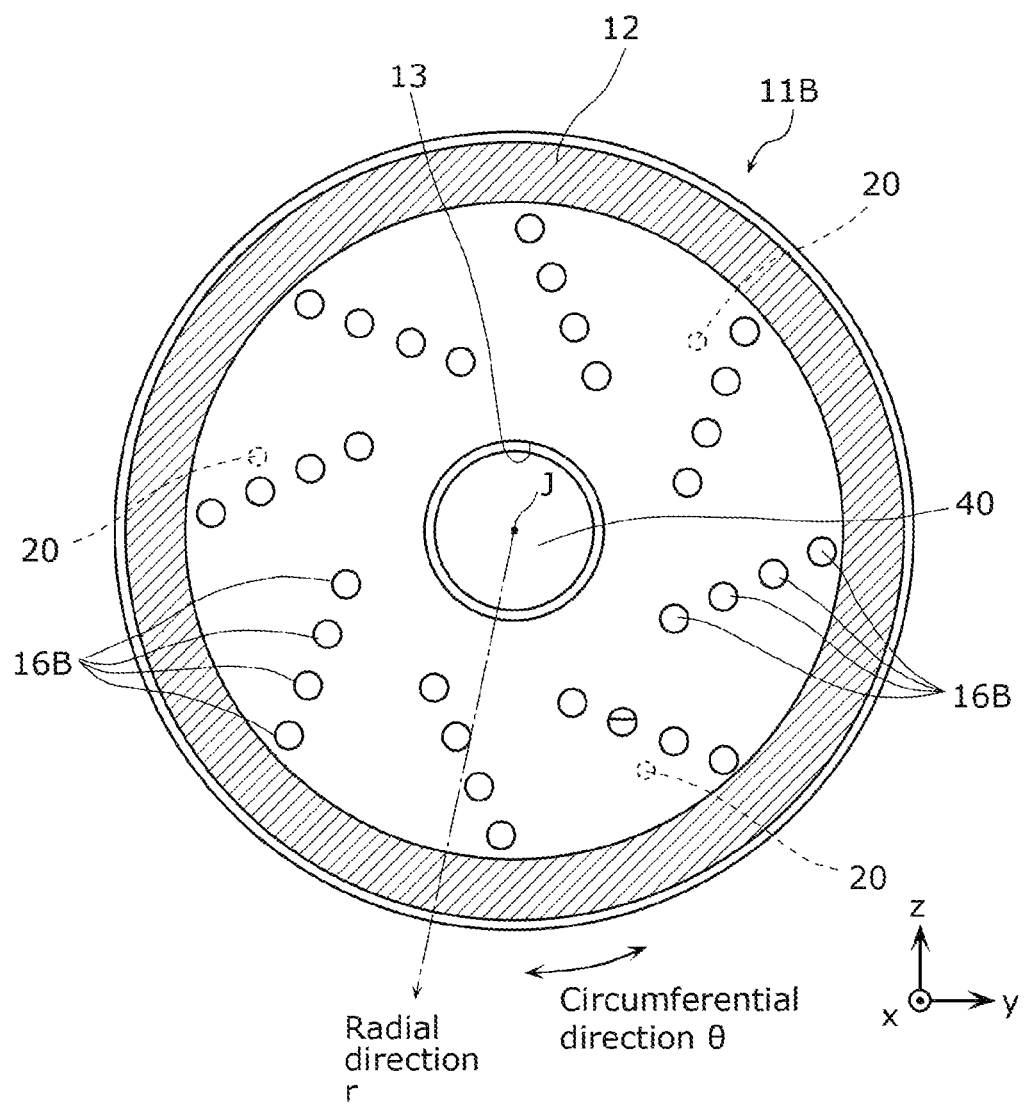
FIG. 8 is a front view of a substrate according to Variation 2 of Embodiment 1, as viewed toward the first principal surface.

FIG. 8 is a front view of substrate 11B according to Variation 2 of Embodiment 1, as viewed toward the first principal surface. Elements that are similar to those illustrated in FIG. 3 are given identical reference characters, and detailed description thereof will be omitted.

Substrate 11B illustrated in FIG. 8 differs in terms of the configuration from substrate 11 according to Embodiment 1 in that substrate 11B includes a plurality of apertures 16B. The following description centers on the differences from Embodiment 1.

[Substrate 11B]

Substrate 11B further includes a plurality of apertures 16B formed for ventilation in a region where phosphor layer 12 is not provided. To be more specific, as viewed toward the first principal surface of substrate 11B, the plurality of apertures 16B are formed along virtual lines that each extend in a curved or a straight line at a predetermined angle or greater relative to radial direction r from positions that are spaced apart from the center of substrate 11B by a predetermined distance and lie at substantially regular intervals in circumferential direction θ. The plurality of apertures 16B function as vent holes through which the wind passes when substrate 11B is driven by motor 40 so as to rotate about axis of rotation J.

In the example illustrated in FIG. 8, the plurality of apertures 16B are each formed into a circular hole. Moreover, the plurality of apertures 16B are formed in a set of four along respective virtual straight lines extending at a predetermined angle relative to radial direction r in a region where neither phosphor layer 12 nor opening 13 is formed. The sets of four apertures 16B are disposed annularly in circumferential direction θ.

The size, the arrangement, and the number of the plurality of apertures 16B are not limited to the example illustrated in FIG. 8. For example, it suffices that apertures 16B are formed in a plurality along the virtual straight lines as long as these apertures 16B allow the wind to pass therethrough smoothly when substrate 11B is driven by motor 40 so as to rotate about axis of rotation J, and the plurality of apertures 16B may be formed in a set of three, a set of five, or the like. Moreover, the case where the eight sets of apertures 16B are formed along the respective virtual straight lines as in the example illustrated in FIG. 8 is not a limiting example, and it suffices that the plurality of apertures 16B be formed along a plurality of such virtual straight lines.

Moreover, the case where the plurality of apertures 16B are formed along virtual straight lines as illustrated in FIG. 8 is not a limiting example, and the plurality of apertures 16B may be formed in a set of a plurality along respective virtual curved lines extending at a predetermined angle or greater relative to radial direction r in a region where neither phosphor layer 12 nor opening 13 is formed.

[Advantageous Effects and Others]

As described above, in phosphor wheel 1 according to the present variation, substrate 11B further includes a plurality of apertures 16B formed for ventilation in a region where phosphor layer 12 is not provided. In addition, as viewed toward the first principal surface, the plurality of apertures 16B are formed along virtual lines that each extend in a curved or a straight line at a predetermined angle or greater relative to radial direction r from positions that are spaced apart from the center of substrate 11B by a predetermined distance and lie at substantially regular intervals in circumferential direction θ.

This configuration allows the wind produced by the plurality of fins 31 to pass through the plurality of apertures 16B as well and makes it possible to blow this wind against phosphor layer 12. Accordingly, the wind produced by the plurality of fins 31 can be used to cool phosphor layer 12 more effectively, and this can help further improve the heat dissipation performance of phosphor wheel 1.

[Variation 3]

Apertures 16B for ventilation are each formed into a circular hole according to Variation 2, but this is not a limiting example. The apertures for ventilation may each be a long hole. Now, a case where the apertures for ventilation are formed into a shape different from that according to Variation 2 will be described as Variation 3.

Figure 9:
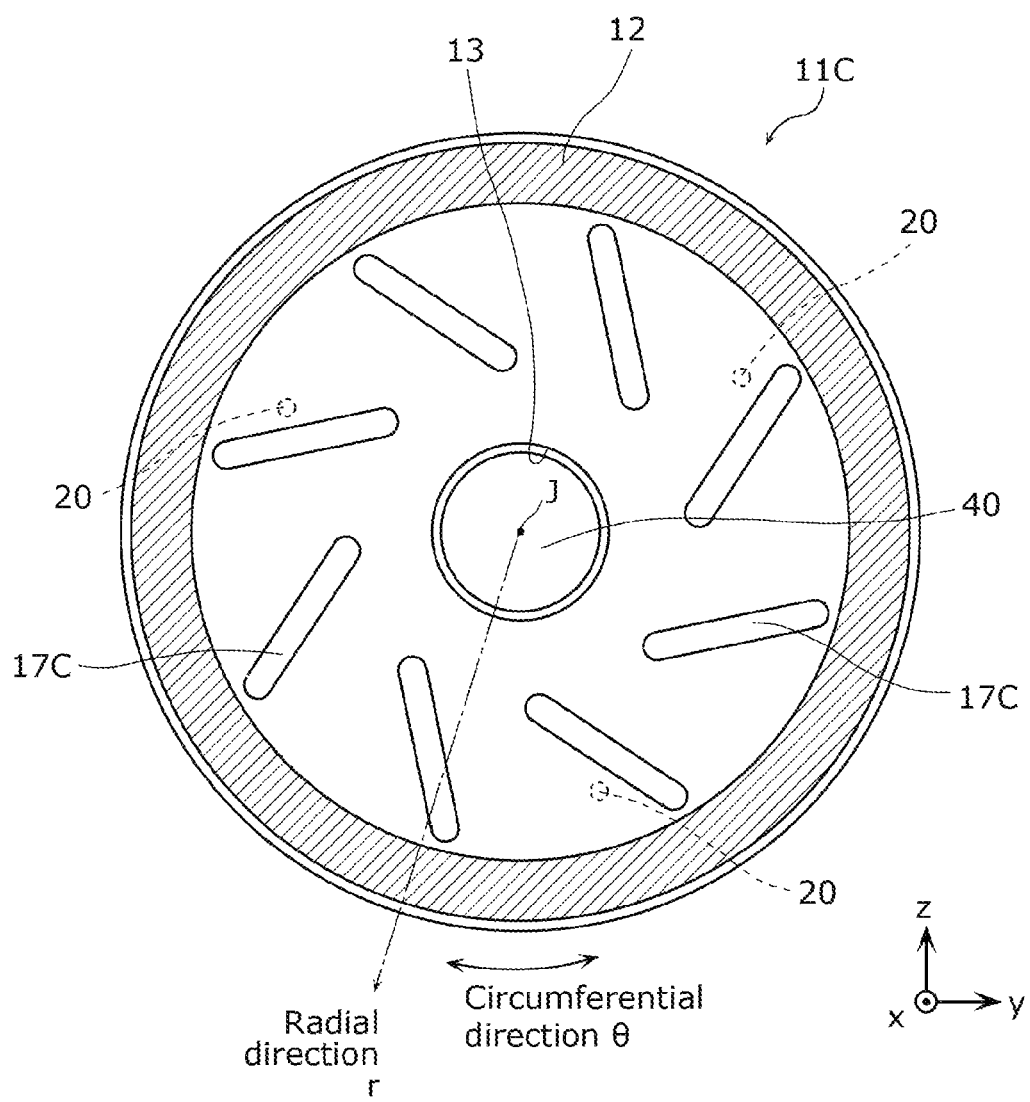
FIG. 9 is a front view of a substrate according to Variation 3 of Embodiment 1, as viewed toward the first principal surface.

FIG. 9 is a front view of substrate 11C according to Variation 3 of Embodiment 1, as viewed toward the first principal surface. Elements that are similar to those illustrated in FIG. 3 or FIG. 8 are given identical reference characters, and detailed description thereof will be omitted.

Substrate 11C illustrated in FIG. 9 differs from substrate 11B according to Variation 2 of Embodiment 1 in terms of the shape of the openings (the apertures) formed for ventilation. The following description centers on the differences from Variation 2 of Embodiment 1.

[Substrate 11C]

Substrate 11C further includes a plurality of openings 17C formed for ventilation in a region where phosphor layer 12 is not provided. To be more specific, as viewed toward the first principal surface of substrate 11C, the plurality of openings 17C are formed along respective virtual lines that each extend in a curved or a straight line at a predetermined angle or greater relative to radial direction r from positions that are spaced apart from the center of substrate 11C by a predetermined distance and lie at substantially regular intervals in circumferential direction θ. The plurality of openings 17C function as vent holes through which the wind passes when substrate 11C is driven by motor 40 so as to rotate about axis of rotation J.

In the example illustrated in FIG. 9, the plurality of openings 17C are each formed into a long hole along a virtual straight line extending at a predetermined angle relative to radial direction r in a region where neither phosphor layer 12 nor opening 13 is formed. Moreover, the plurality of openings 17C are formed so as to be located annularly in circumferential direction θ.

The size, the number of arrays, and the arrangement of the plurality of openings 17C are not limited to the example illustrated in FIG. 9. For example, the case where eight openings 17C are formed along the respective virtual straight lines as in the example illustrated in FIG. 9 is not a limiting example, and it suffices that the plurality of openings 17C be formed along respective such virtual straight lines. Moreover, the case where the plurality of openings 17C are each formed into a linear long hole is not a limiting example, and the plurality of openings 17C may be formed along respective virtual curved lines extending at a predetermined angle or greater relative to radial direction r in a region where neither phosphor layer 12 nor opening 13 is formed.

[Advantageous Effects and Others]

As described above, in phosphor wheel 1 according to the present variation, substrate 11C further includes a plurality of openings 17C formed for ventilation in a region where phosphor layer 12 is not provided. In addition, as viewed toward the first principal surface, the plurality of openings 17C are formed along respective virtual lines that each extend in a curved or a straight line at a predetermined angle or greater relative to the radial direction from positions that are spaced apart from the center of substrate 11C by a predetermined distance and lie at substantially regular intervals in circumferential direction θ.

This configuration allows the wind produced by the plurality of fins 31 to pass through the plurality of openings 17C as well and makes it possible to blow this wind against phosphor layer 12. Accordingly, the wind produced by the plurality of fins 31 can be used to cool phosphor layer 12 more effectively, and this can help further improve the heat dissipation performance of phosphor wheel 1.

[Variation 4]

In the case described according to Variation 4, phosphor wheel 1 includes clearance retaining members 20D having a shape different from the shape of clearance retaining members 20 described according to Embodiment 1.

Figure 10A:
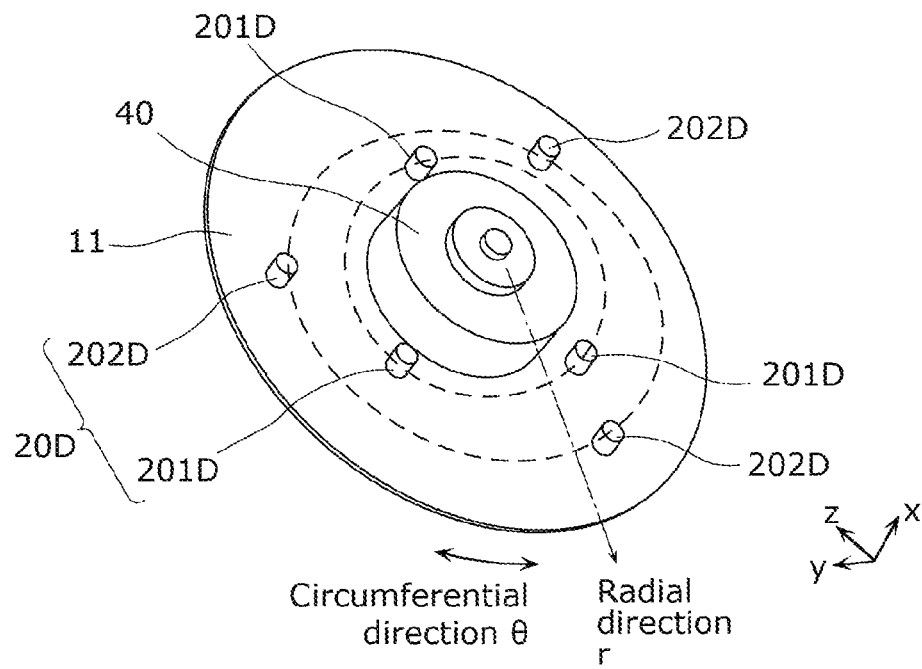
FIG. 10A is a perspective view of a substrate and clearance retaining members according to Variation 4 of Embodiment 1, as viewed toward the second principal surface.
Figure 10B:
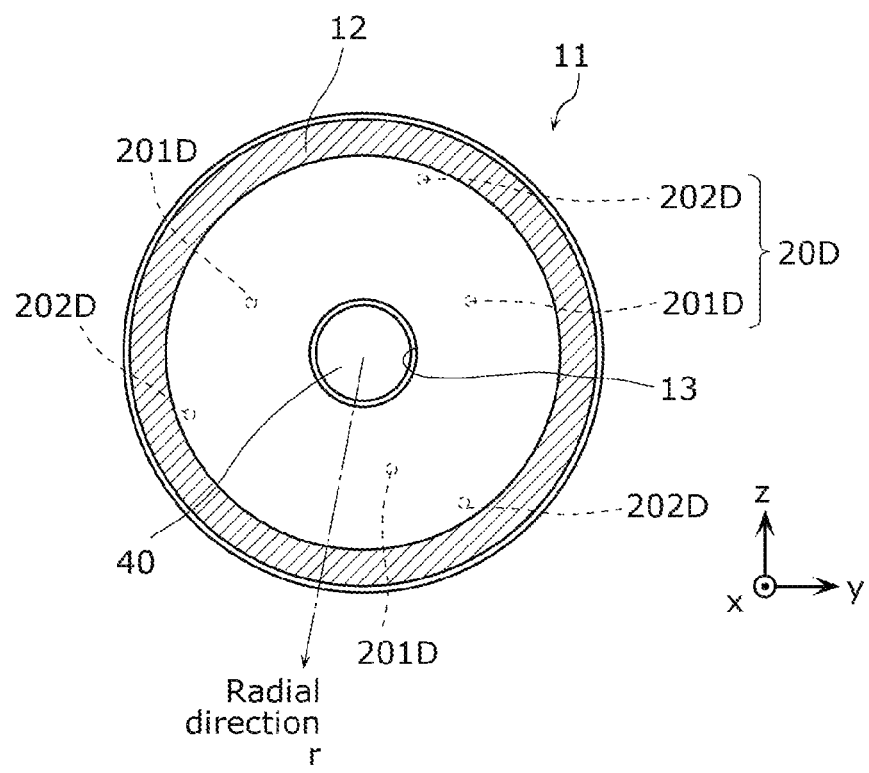
FIG. 10B is a front view of the substrate according to Variation 4 of Embodiment 1, as viewed toward the first principal surface.

FIG. 10A is a perspective view of substrate 11 and clearance retaining members 20D according to Variation 4 of Embodiment 1, as viewed toward the second principal surface. FIG. 10B is a front view of substrate 11 according to Variation 4 of Embodiment 1, as viewed toward the first principal surface. Elements that are similar to those illustrated in FIG. 3 and so on are given identical reference characters, and detailed description thereof will be omitted.

Clearance retaining members 20D illustrated in FIG. 10A and FIG. 10B differ from clearance retaining members 20 according to Embodiment 1 in that two or more sets of a plurality of clearance retaining members 20D are disposed along respective outlines having different diameters. The following description centers on the differences from Embodiment 1.

[Clearance Retaining Member 20D]

As viewed in the direction in which substrate 11 and heat dissipating member 30 overlap each other, two or more sets of a plurality of clearance retaining members 20D are disposed along respective outlines having different diameters, and the plurality of clearance retaining members 20D are disposed at positions where the plurality of clearance retaining member 20D do not overlap each other in radial direction r.

As with clearance retaining members 20 according to Embodiment 1, clearance retaining members 20D function as spacers as well as as paths for heat conduction. In other words, clearance retaining members 20D are disposed so as to secure a certain distance between substrate 11 and heat dissipating member 30. Moreover, clearance retaining members 20D each make contact with substrate 11 and heat dissipating member 30 so as to conduct the heat in substrate 11 to heat dissipating member 30.

In the example illustrated in FIG. 10A and FIG. 10B, six clearance retaining members 20D are disposed at respective positions that are inward from phosphor layer 12 and lie at substantially regular intervals in circumferential direction θ of two outlines having different diameters. To be more specific, as illustrated in FIG. 10A and FIG. 10B, clearance retaining members 20D according to the present variation include three clearance retaining members 201D and three clearance retaining members 202D. Three clearance retaining members 201D are disposed at positions that lie at substantially regular intervals in circumferential direction θ of the outline having a diameter smaller than the diameter of the outline along which three clearance retaining members 202D are disposed. Three clearance retaining members 202D are disposed at positions that lie at substantially regular intervals in circumferential direction θ of the outline having a diameter greater than the diameter of the outline along which three clearance retaining members 201D are disposed. Moreover, as illustrated in FIG. 10A, for example, three clearance retaining members 201D and three clearance retaining members 202D are disposed at positions where three clearance retaining members 201D and three clearance retaining members 202D do not overlap each other in radial direction r.

The number of clearance retaining members 20D and the positions where clearance retaining members 20D are disposed are not limited to the example illustrated in FIG. 10A and FIG. 10B. The number of clearance retaining members 20D and the positions where clearance retaining members 20D are disposed can be determined as desired as long as clearance retaining members 20D do not interfere with the plurality of fins 31 and the plurality of regions 32 in heat dissipating member 30 and do not overlap each other in the radial direction when clearance retaining members 20D are disposed in circumferential directions θ along outlines having different diameters.

[Advantageous Effects and Others]

As described above, in phosphor wheel 1 according to the present variation, as viewed in the direction in which substrate 11 and heat dissipating member 30 overlap each other, a plurality of sets of one or more clearance retaining members 20D are disposed along respective outlines having different diameters at positions where clearance retaining members 20D do not overlap each other in the radial direction.

This configuration can increase the number of paths for heat conduction for transmitting the heat produced in phosphor layer 12 from substrate 11 to heat dissipating member 30, and thus the heat dissipation performance of phosphor wheel 1 can be further improved.

[Variation 5]

In the case described according to Variation 5, phosphor wheel 1 includes clearance retaining member 20E having a shape different from the shape described according to Embodiment 1 or the shape described according to Variation 4.

Figure 11:
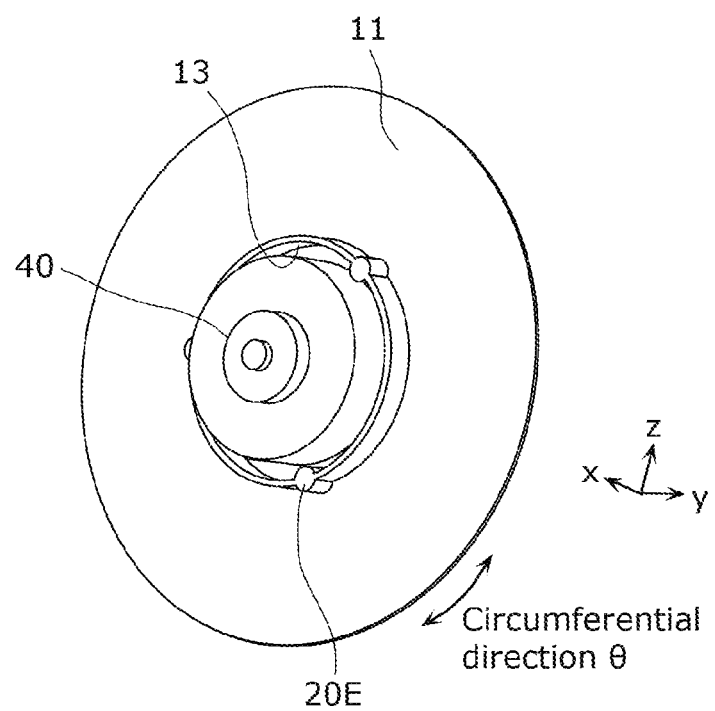
FIG. 11 is a perspective view of a substrate and a clearance retaining member according to Variation 5 of Embodiment 1, as viewed toward the second principal surface.

FIG. 11 is a perspective view of substrate 11 and clearance retaining member 20E according to Variation 5 of Embodiment 1, as viewed toward the second principal surface. Elements that are similar to those illustrated in FIG. 3 and so on are given identical reference characters, and detailed description thereof will be omitted.

Clearance retaining member 20E illustrated in FIG. 11 differs in terms of the configuration from the clearance retaining members according to Embodiment 1 or Variation 4 in that clearance retaining member 20E has a ring shape (an annular shape). The following description centers on the differences from Embodiment 1 or Variation 4.

[Clearance Retaining Member 20E]

As viewed in the direction in which substrate 11 and heat dissipating member 30 overlap each other, clearance retaining member 20E is disposed in an annular shape lying at a predetermined radius from the center of substrate 11.

As with clearance retaining members 20 according to Embodiment 1 or clearance retaining members 20D according to Variation 4, clearance retaining member 20E functions as a spacer as well as as a path for heat conduction. In other words, clearance retaining member 20E is disposed so as to secure a certain distance between substrate 11 and heat dissipating member 30. Moreover, clearance retaining member 20E makes contact with substrate 11 and heat dissipating member 30 so as to conduct the heat in substrate 11 to heat dissipating member 30.

In the example illustrated in FIG. 11, clearance retaining member 20E is formed in a ring shape (an annular shape) having a predetermined radius from the center of substrate 11 so that clearance retaining member 20E is located in a region of substrate 11 where opening 13 is not provided. It is preferable that clearance retaining member 20E be formed close to opening 13 so as not to interfere with the wind created by the flow of the air produced by the plurality of fins 31.

[Advantageous Effects and Others]

As described above, in phosphor wheel 1 according to the present variation, as viewed in the direction in which substrate 11 and heat dissipating member 30 overlap each other, clearance retaining member 20E is disposed in a ring shape (an annular shape) having a predetermined radius from the center of substrate 11.

This configuration can increase the size of the path for heat conduction for transmitting the heat produced in phosphor layer 12 from substrate 11 to heat dissipating member 30, and thus the heat dissipation performance of phosphor wheel 1 can be further improved.

In this example, as illustrated in FIG. 11, clearance retaining member 20E is formed into a plate-like shape in its thickness direction (in the X-axis direction), that is, at its side surface of the annular shape, but this is not a limiting example. A plurality of slits may be formed in the side surface of clearance retaining member 20E, or a plurality of punch holes may be provided in the side surface of clearance retaining member 20E. In other words, as viewed in the direction perpendicular to the direction in which substrate 11 and heat dissipating member 30 overlap each other, a plurality of slits or a plurality of punch holes may be formed in clearance retaining member 20E.

With this configuration, when opening 33 provided at the center of heat dissipating member 30 is used for ventilation, the wind that has passed through opening 33 can be passed through the slits or the punch holes in clearance retaining member 20E so as to send that wind to the outer side of the space (the air gap) between substrate 11 and heat dissipating member 30. In other words, the wind that has passed through opening 33 can be used to cool phosphor layer 12. Since this configuration can increase the amount of the wind that passes through this space, the heat dissipation performance of phosphor wheel 1 can be further improved.

Embodiment 2

According to Embodiment 1, configurations and so on for improving the heat dissipation performance of phosphor wheel 1 by, for example, forming the plurality of fins 31 have been described. Although such configurations where the plurality of fins 31 are formed in heat dissipating member 30 can improve the heat dissipation performance of phosphor wheel 1, there is also a drawback in that such a configuration produces wind noise.

Accordingly, a configuration of phosphor wheel 1 that can suppress such wind noise will be described according to Embodiment 2.

In the case described below as one aspect for suppressing wind noise, a slit is formed at a center portion of each of a plurality of fins formed in a heat dissipating member.

Figure 12:
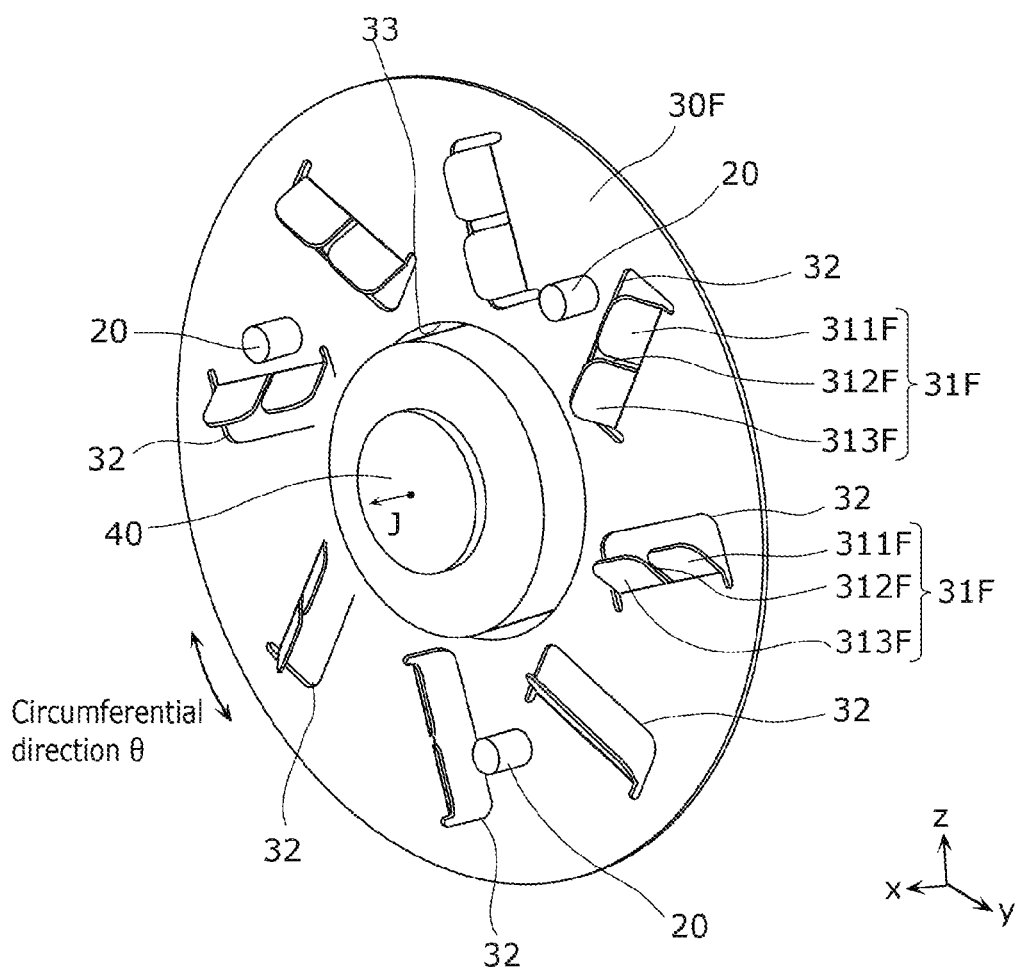
FIG. 12 is a perspective view of a heat dissipating member according to Embodiment 2, as viewed toward the first principal surface.

FIG. 12 is a perspective view of heat dissipating member 30F according to Embodiment 2, as viewed toward the first principal surface. Elements that are similar to those illustrated in FIG. 4 and so on are given identical reference characters, and detailed description thereof will be omitted.

Heat dissipating member 30F illustrated in FIG. 12 differs in terms of the configuration from heat dissipating member 30 according to Embodiment 1 in that heat dissipating member 30F includes a plurality of fins 31F in each of which a slit is formed at its center portion. The following description centers on the differences from Embodiment 1.

[Heat Dissipating Member 30F]

As with heat dissipating member 30 according to Embodiment 1, heat dissipating member 30F is a plate-like member that is disposed so as to oppose the second principal surface of substrate 11 and rotated along with substrate 11. Heat dissipating member 30F includes a plurality of fins 31F formed by cutting a plurality of regions 32 in the plate-like member and raising the cut plurality of regions 32 toward the second principal surface.

<Fins 31F>

As with fins 31 according to Embodiment 1, each fin 31F is formed by cutting region 32 that is a partial region in the plate-like member of heat dissipating member 30F and by raising cut region 32 toward the second principal surface of substrate 11. Moreover, as illustrated in FIG. 12, for example, the plurality of fins 31F are located annularly in circumferential direction θ at a certain distance from the center (axis of rotation J).

According to the present embodiment, the plurality of fins 31F are each split into two parts by a slit formed at its center portion. To be more specific, as illustrated in FIG. 12, the plurality of fins 31F are each constituted by fin portion 311F, slit 312F, and fin portion 313F. In other words, the plurality of fins 31F are each constituted by fin portion 311F and fin portion 313F resulting as one substantially rectangular shape (one substantially trapezoidal shape) is split into two substantially rectangular shapes (two substantially trapezoidal shapes) by slit 312F located at the center portion. As illustrated in FIG. 12, the corners of fin portions 311F and fin portions 313F at their leading ends may each be cut off to a round shape. Moreover, as illustrated in FIG. 12, fin portions 311F and fin portions 313F are cut and raised so as to extend at a certain angle relative to the second principal surface of substrate 11 (or relative to the front surface of the heat dissipating member).

The size of fin portions 311F, slits 312F, and fin portions 313F is not limited to the example illustrated in FIG. 12. The size of fin portions 311F, slits 312F, and fin portions 313F can be determined as desired as long as wind noise can be suppressed.

[Advantageous Effects and Others]

As described above, in phosphor wheel 1 according to the present embodiment, the plurality of fins 31F formed in heat dissipating member 30F are each split into two parts by slit 312F formed at the center portion.

With this configuration, first, the wind produced by the plurality of fins 31F can be used to cool phosphor layer 12, and thus the heat dissipation performance of phosphor wheel 1 can be improved. In addition, since the plurality of fins 31F each include slit 312F formed at its center portion, wind noise can be suppressed. In other words, according to the present embodiment, the heat dissipation performance of phosphor wheel 1 can be improved, and the wind noise to be produced by the plurality of fins 31F can be suppressed at the same time.

The configuration for suppressing wind noise is not limited to the mode described above. Now, configurations for suppressing wind noise that are different from the mode described above will be described as Variation 1 to Variation 4.

[Variation 1]

In the case described according to Variation 1, in order to suppress wind noise, a plurality of fins are each split into two parts by providing a space at its center portion, and the resulting two parts are cut and raised at different angles relative to the radial direction.

Figure 13:
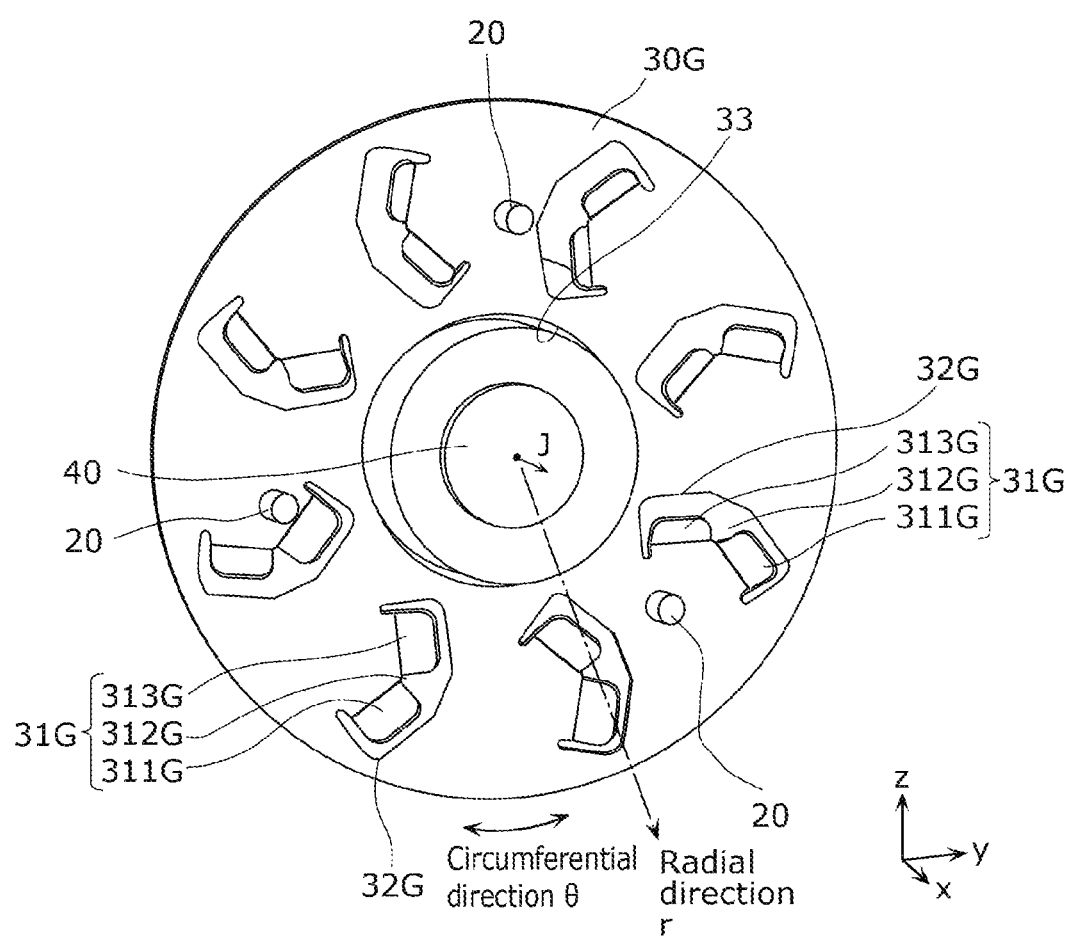
FIG. 13 is a perspective view of a heat dissipating member according to Variation 1 of Embodiment 2, as viewed toward the first principal surface.

FIG. 13 is a perspective view of heat dissipating member 30G according to Variation 1 of Embodiment 2, as viewed toward the first principal surface. Elements that are similar to those illustrated in FIG. 4, FIG. 12, and so on are given identical reference characters, and detailed description thereof will be omitted.

Heat dissipating member 30G illustrated in FIG. 13 differs in terms of the configuration from heat dissipating member 30F according to Embodiment 2 in that split parts of each fin 31G are cut and raised at different angles relative to radial direction r. The following description centers on the differences from Embodiment 2.

[Heat Dissipating Member 30G]

As with heat dissipating member 30F according to Embodiment 2, heat dissipating member 30G is a plate-like member that is disposed so as to oppose the second principal surface of substrate 11 and rotated along with substrate 11. According to the present variation, heat dissipating member 30G includes a plurality of fins 31G formed by cutting a plurality of regions 32G in the plate-like member and by raising the cut plurality of regions 32G toward the second principal surface.

<Fins 31G>

Each fin 31G is formed by cutting region 32G that is a partial region in the plate-like member of heat dissipating member 30G and has a bent shape and by raising cut region 32G toward the second principal surface of substrate 11. Moreover, as illustrated in FIG. 13, for example, the plurality of fins 31G are located annularly in circumferential direction θ at a certain distance from the center (axis of rotation J).

According to the present variation, the plurality of fins 31G are each split into two parts by a space provided at the position corresponding to the position where the bent shape of each region 32G is bent. Then, the resulting two parts of each fin 31G are cut and raised at different angles relative to the radial direction of heat dissipating member 30G.

To be more specific, as illustrated in FIG. 13, the plurality of fins 31G are each constituted by fin portion 311G, space portion 312G, and fin portion 313G. In other words, the plurality of fins 31G are each constituted by fin portion 311G and fin portion 313G that are formed into two substantially rectangular shapes (two substantially trapezoidal shapes) as space portion 312G is provided. As illustrated in FIG. 13, the corners of fin portions 311G and fin portions 313G at their leading ends may each be cut off to a round shape.

Moreover, as illustrated in FIG. 13, fin portions 311G and fin portions 313G are cut and raised so as to extend at a certain angle relative to the second principal surface of substrate 11 (or relative to the front surface of the heat dissipating member). In addition, fin portions 311G and fin portions 313G are cut and raised at positions where fin portions 311G and fin portions 313G extend at different angles relative to radial direction r of heat dissipating member 30G.

The size, the shape, and so on of fin portions 311G and fin portions 313G are not limited to the example illustrated in FIG. 13.

<Regions 32G>

Regions 32 are partial regions in the plate-like member of heat dissipating member 30G and serve as through-holes after the plurality of fins 31G have been formed. To be more specific, as illustrated in FIG. 13, the plurality of regions 32G are similar in shape and each have a bent shape. As viewed toward the first principal surface of substrate 11, the plurality of regions 32G are located at positions that are spaced apart from the center of heat dissipating member 30G by a predetermined distance and lie at substantially regular intervals in circumferential direction θ.

The shape, the size, the arrangement, and so on of regions 32G are not limited to the example illustrated in FIG. 13.

[Advantageous Effects and Others]

As described above, in phosphor wheel 1 according to the present variation, the plurality of regions 32G formed in heat dissipating member 30G are similar in shape and each have a bent shape. Moreover, as viewed toward the first principal surface of substrate 11, the plurality of regions 32G are located at positions that are spaced apart from the center of heat dissipating member 30G by a predetermined distance and lie at substantially regular intervals in circumferential direction θ. Furthermore, the plurality of fins 31G formed in heat dissipating member 30G are each split into two parts by a space provided at the position corresponding to the position where the bent shape is bent. The resulting two parts of each fin are cut and raised at different angles relative to the radial direction of heat dissipating member 30G.

With this configuration, first, the wind produced by the plurality of fins 31G can be used to cool phosphor layer 12, and thus the heat dissipation performance of phosphor wheel 1 can be improved. In addition, the plurality of fins 31G each include a space provided at the position corresponding to the position where the bent shape of corresponding region 32G formed in heat dissipating member 30G is bent, and thus wind noise can be suppressed. In other words, according to the present variation, the heat dissipation performance of phosphor wheel 1 can be improved, and the wind noise to be produced by the plurality of fins 31G can be suppressed at the same time.

[Variation 2]

In the case described according to Variation 2, in order to suppress wind noise, a plurality of fins that have been cut and raised are each double-folded.

Figure 14:
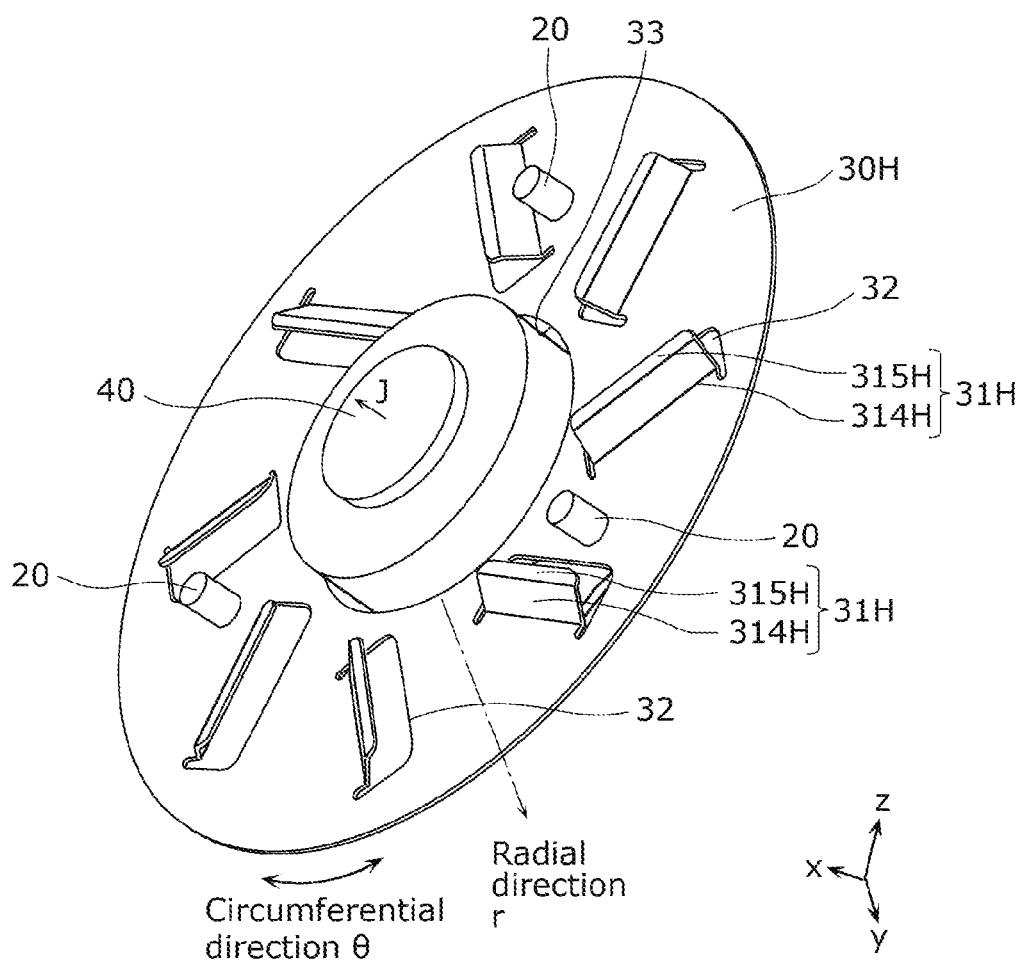
FIG. 14 is a perspective view of a heat dissipating member according to Variation 2 of Embodiment 2, as viewed toward the first principal surface.

FIG. 14 is a perspective view of heat dissipating member 30H according to Variation 2 of Embodiment 2, as viewed toward the first principal surface. Elements that are similar to those illustrated in FIG. 4 and so on are given identical reference characters, and detailed description thereof will be omitted.

Heat dissipating member 30H illustrated in FIG. 14 differs in terms of the configuration from heat dissipating member 30 according to Embodiment 1 in that a plurality of fins 31H are each double-folded. The following description centers on the differences from Embodiment 1.

[Heat Dissipating Member 30H]

As with heat dissipating member 30 according to Embodiment 1, heat dissipating member 30H is a plate-like member that is disposed so as to oppose the second principal surface of substrate 11 and rotated along with substrate 11. Heat dissipating member 30H includes a plurality of fins 31H formed by cutting a plurality of regions 32 in the plate-like member and by raising the cut plurality of regions 32 toward the second principal surface.

<Fins 31H>

As with fins 31 according to Embodiment 1, each fin 31H is formed by cutting region 32 that is a partial region in the plate-like member of heat dissipating member 30 and by raising cut region 32 toward the second principal surface of substrate 11. Moreover, according to the present variation, leading end portion 315H of each of the plurality of cut and raised fins 31H is bent further. To be more specific, leading end portion 315H of each of the plurality of fins 31H is cut and raised at an angle different from the angle at which portion 314H of each of the plurality of fins 31H other than leading end portion 315H is cut and raised, and as cut and raised at this angle, leading end portion 315H is oriented, more than portion 314H is, toward one of the surfaces of heat dissipating member 30H where heat dissipating member 30H opposes the second principal surface.

In this manner, each fin 31H formed by being cut and raised is double-folded.

Furthermore, as illustrated in FIG. 14, for example, the plurality of fins 31H are located annularly in circumferential direction θ at a certain distance from the center (axis of rotation J).

The position where the leading end portion of each fin 31H is double-folded, the shape of the double-folded leading end portion, and so on are not limited to the example illustrated in FIG. 14.

[Advantageous Effects and Others]

As described above, in phosphor wheel 1 according to the present variation, leading end portion 315H of each of the plurality of fins 31H formed in heat dissipating member 30H is cut and raised at an angle different from the angle at which portion 314H of each of the plurality of fins 31H other than leading end portion 315H is cut and raised. In addition, as cut at this angle, leading end portion 315H is oriented toward one of the surfaces of heat dissipating member 30H where heat dissipating member 30H opposes the second principal surface more than the portion of each of the plurality of fins 31H other than leading end portion 315H is.

With this configuration, since each of the plurality of fins 31H is double-folded, wind noise can be suppressed. In other words, according to the present variation, the heat dissipation performance of phosphor wheel 1 can be improved, and the wind noise to be produced by the plurality of fins 31H that are each double-folded can be suppressed at the same time.

[Variation 3]

In the case described according to Variation 3, in order to suppress wind noise, a plurality of holes are provided in each of a plurality of fins.

Figure 15:
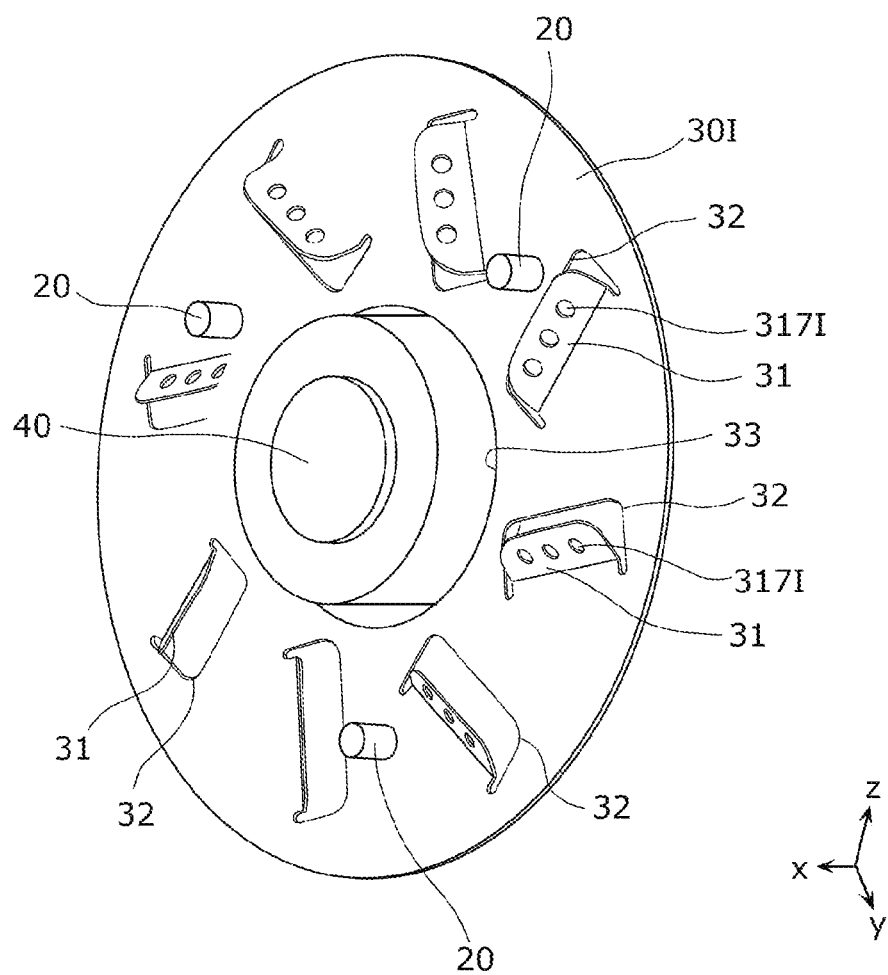
FIG. 15 is a perspective view of a heat dissipating member according to Variation 3 of Embodiment 2, as viewed toward the first principal surface.

FIG. 15 is a perspective view of heat dissipating member 30I according to Variation 3 of Embodiment 2, as viewed toward the first principal surface. Elements that are similar to those illustrated in FIG. 4 and so on are given identical reference characters, and detailed description thereof will be omitted.

Heat dissipating member 30I illustrated in FIG. 15 differs in terms of the configuration from heat dissipating member 30 according to Embodiment 1 in that a plurality of holes 317I are provided in each of the plurality of fins 31. The following description centers on the differences from Embodiment 1.

[Heat Dissipating Member 30I]

As with heat dissipating member 30 according to Embodiment 1, heat dissipating member 30I is a plate-like member that is disposed so as to oppose the second principal surface of substrate 11 and rotated along with substrate 11. Heat dissipating member 30I includes a plurality of fins 31 formed by cutting a plurality of regions 32 in the plate-like member and raising the cut plurality of regions 32 toward the second principal surface.

<Fins 31>

Each fin 31 is formed by cutting region 32 that is a partial region in the plate-like member of heat dissipating member 30I and by raising cut region 32 toward the second principal surface of substrate 11. According to the present variation, a plurality of holes 317I are further provided in each of the plurality of fins 31.

The number, the position, the shape, the size, and so on of the plurality of holes 317I provided in each fin 31 are not limited to the example illustrated in FIG. 15.

[Advantageous Effects and Others]

As described above, in phosphor wheel 1 according to the present variation, the plurality of holes 317I are further provided in each of the plurality of fins 31 formed in heat dissipating member 30I.

With this configuration, the heat dissipation performance of phosphor wheel 1 can be improved, and as the plurality of holes 317I are provided in each of the plurality of fins 31, wind noise to be produced by the plurality of fins 31 can be suppressed.

[Variation 4]

In the case described according to Variation 4, in order to suppress wind noise, any adjacent two of the plurality of region for forming a plurality of fins by cutting and raising the plurality of regions have different lengths in the longitudinal direction.

Figure 16:
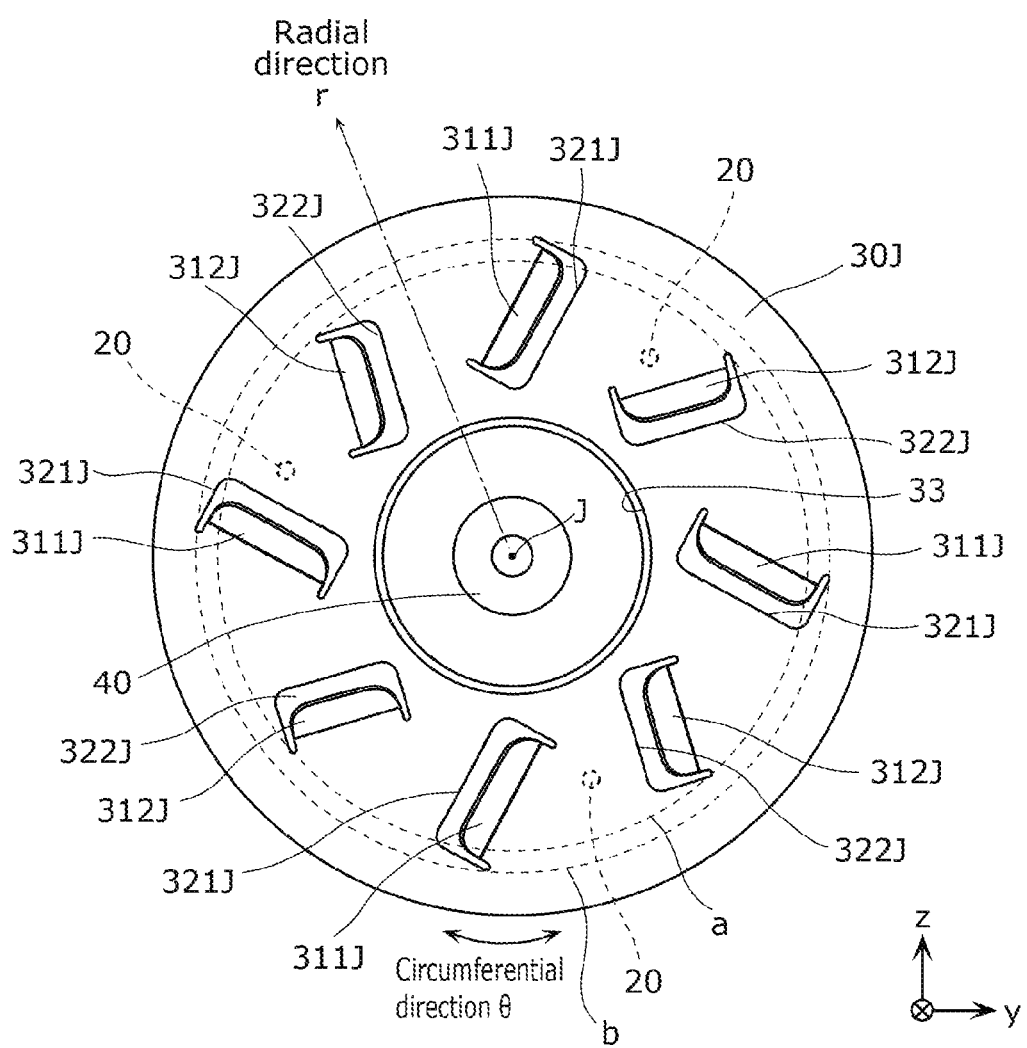
FIG. 16 is a rear view of a heat dissipating member according to Variation 4 of Embodiment 2, as viewed toward the second principal surface.

FIG. 16 is a rear view of heat dissipating member 30J according to Variation 4 of Embodiment 2, as viewed toward the second principal surface. Elements that are similar to those illustrated in FIG. 5 and so on are given identical reference characters, and detailed description thereof will be omitted.

Heat dissipating member 30J illustrated in FIG. 16 differs from heat dissipating member 30 according to Embodiment 1 in terms of the configurations of the plurality of fins and the plurality of regions. The following description centers on the differences from Embodiment 1.

[Heat Dissipating Member 30J]

As with heat dissipating member 30 according to Embodiment 1, heat dissipating member 30J is a plate-like member that is disposed so as to oppose the second principal surface of substrate 11 and rotated along with substrate 11. Heat dissipating member 30J includes a plurality of fins formed by cutting a plurality of regions in the plate-like member and by raising the cut plurality of regions toward the second principal surface.

<Fins 311J and 312J>

As illustrated in FIG. 16, the plurality of fins according to the present variation are located apart from each other in circumferential direction θ of heat dissipating member 30J, as viewed in the direction in which substrate 11 and heat dissipating member 30J overlap each other. Moreover, according to the present variation, as illustrated in FIG. 16, for example, the plurality of fins include two sets of fins 311J and 312J.

Each fin 311J is formed by cutting region 321J that is a partial region in the plate-like member of heat dissipating member 30J and by raising cut region 321J toward the second principal surface of substrate 11. In a similar manner, each fin 312J is formed by cutting region 322J that is a partial region in the plate-like member of heat dissipating member 30J and by raising cut region 322J toward the second principal surface of substrate 11.

As illustrated in FIG. 16, fins 311J and fins 312J have different lengths in the longitudinal direction. Moreover, the outline connecting the outer peripheral ends of the plurality of fins 311J and the outline connecting the outer peripheral ends of the plurality of fins 312J have different diameters. In other words, any adjacent two of the plurality of fins according to the present variation have different lengths in the longitudinal direction, and respective outlines connecting the outer peripheral ends of the two sets of fins have difference diameters.

<Regions 321J and 322J>

As illustrated in FIG. 16, the plurality of regions according to the present variation are located apart from each other at substantially regular intervals in circumferential direction θ of heat dissipating member 30J, as viewed in the direction in which substrate 11 and heat dissipating member 30J overlap each other. The plurality of regions according to the present variation are located along respective virtual straight lines that each extend at a predetermined angle or greater relative to the radial direction, as viewed in the direction in which substrate 11 and heat dissipating member 30J overlap each other.

Moreover, according to the present variation, as illustrated in FIG. 16, for example, the plurality of regions include two sets of regions 321J and 322J.

As illustrated in FIG. 16, the length (first length $d_1$) of each region 321J in the longitudinal direction and the length (second length $d_2$) of each region 322J in the longitudinal direction differ from each other. Moreover, diameter b of an outline connecting the outer peripheral ends of the plurality of regions 321J and diameter a of an outline connecting the outer peripheral ends of the plurality of regions 322J differ from each other. In other words, according to the present variation, any adjacent two of the plurality of regions have different lengths in the longitudinal direction, as viewed in the direction in which substrate 11 and heat dissipating member 30J overlap each other. Moreover, according to the present variation, the length of each of the plurality of regions in the longitudinal direction is either first length $d_1$ or second length $d_2$ that is shorter than first length $d_1$. The length in the longitudinal direction of region 321J that is one of the two adjacent regions is first length $d_1$, whereas the length in the longitudinal direction of region 322J that is the other of the two adjacent regions is second length $d_2$. Furthermore, connecting the outer peripheral ends of the plurality of regions yields two or more outlines of different diameters.

[Advantageous Effects and Others]

As described above, in phosphor wheel 1 according to the present variation, connecting the outer peripheral ends of the plurality of regions formed in heat dissipating member 30J yields two or more outlines of different diameters. With this configuration, since any adjacent two of the plurality of fins are not aligned in circumferential direction θ, wind noise can be suppressed.

Moreover, any adjacent two of the plurality of regions may have different lengths in the longitudinal direction, as viewed in the direction in which substrate 11 and heat dissipating member 30J overlap each other. With this configuration, since any adjacent two of the plurality of fins differ in shape in circumferential direction θ, wind noise can be suppressed.

Furthermore, the length of each of the plurality of regions in the longitudinal direction is either the first length or the second length that is shorter than first length. The length of one of the two adjacent regions is the first length, whereas the length of the other of the two adjacent regions is the second length.

With this configuration, while the regions that are adjacent in circumferential direction θ have different shapes, the plurality of regions are formed such that the longer ones and the shorter ones in the longitudinal direction appear in an alternating manner, and thus wind noise can be further suppressed.

It is to be noted that the plurality of regions and the plurality of fin according to the present variation are not limited to the example illustrated in FIG. 16. For example, the outer peripheral ends of the plurality of regions may lie on a single outline, and it may suffice that merely any adjacent two of the plurality of regions have different lengths in the longitudinal direction as viewed in the direction in which substrate 11 and heat dissipating member 30J overlap each other. Alternatively, as long as connecting the outer peripheral ends of the plurality of regions yields two or more outlines of different diameters, the plurality of regions may have the same length in the longitudinal direction.

Embodiment 3

In the cases described according to Embodiment 1 and Embodiment 2, phosphor wheel 1 includes clearance retaining members 20, but these are not limiting examples. In place of the clearance retaining members, a component that can implement the function of the clearance retaining members may be formed on the heat dissipating member included in phosphor wheel 1. This case will be described below as Embodiment 3.

[Phosphor Wheel 1A]

Figure 17:
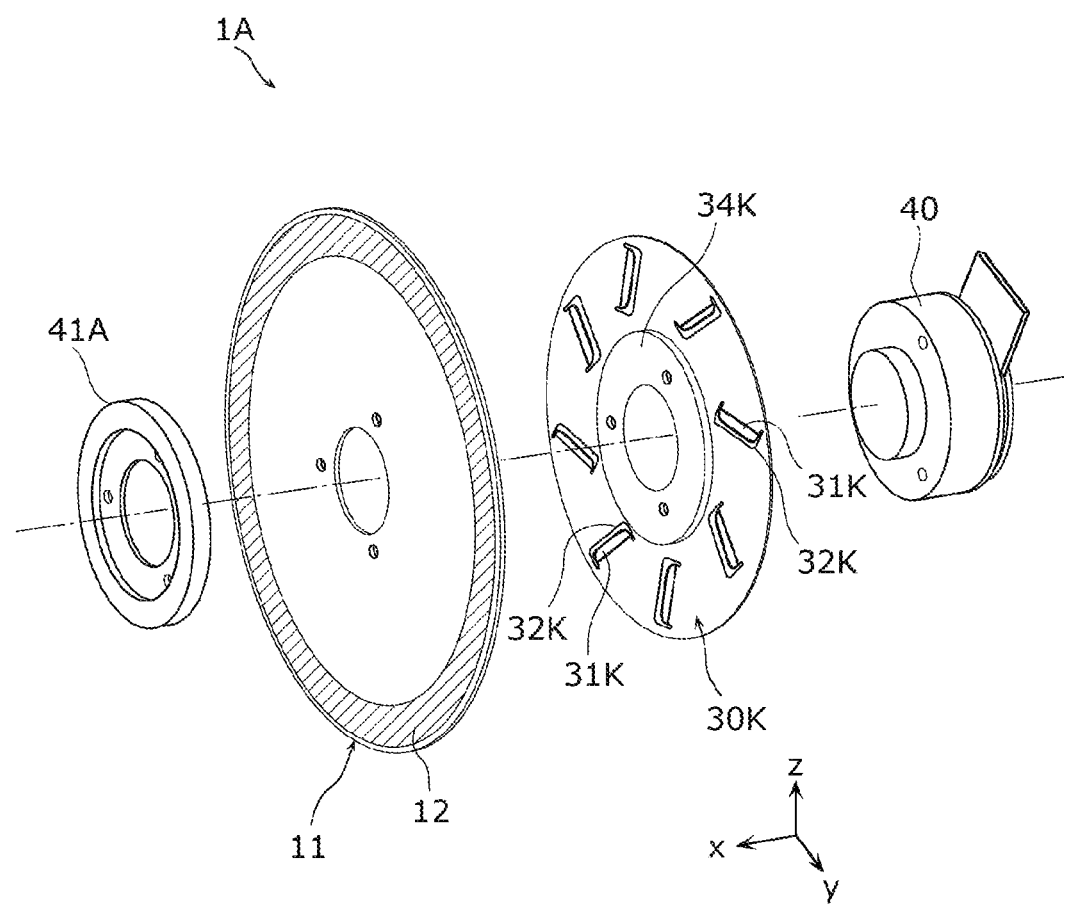
FIG. 17 is an exploded perspective view of a phosphor wheel according to Embodiment 3.
Figure 18:
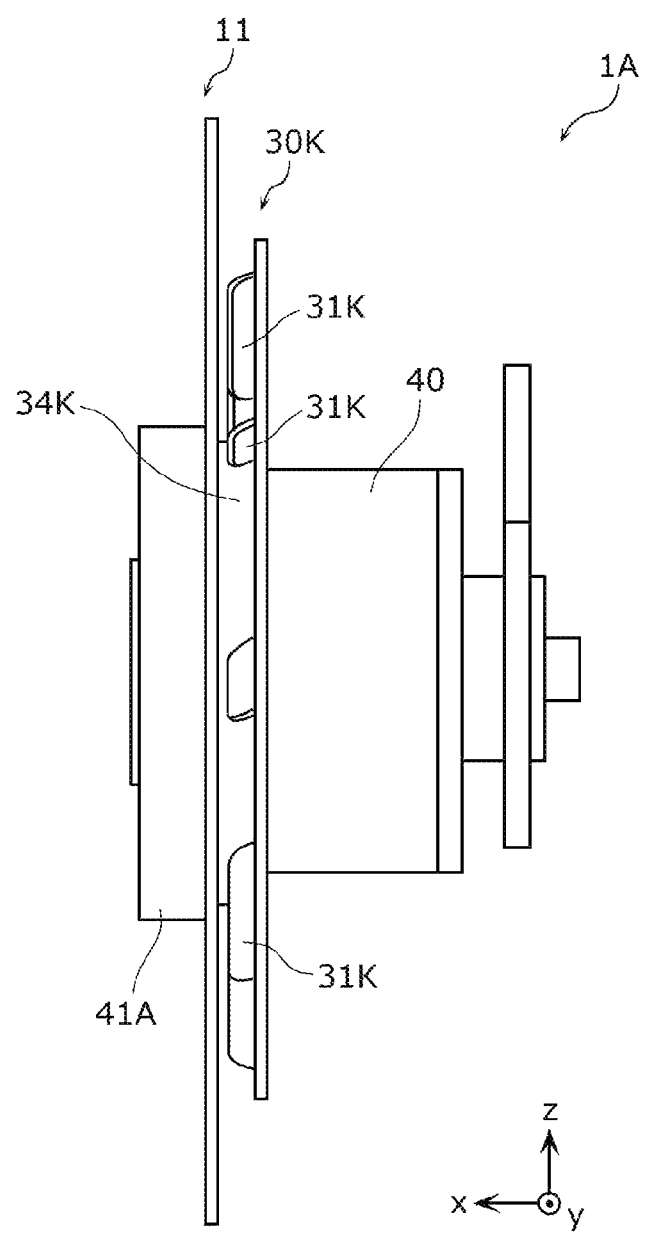
FIG. 18 is a side view of the phosphor wheel according to Embodiment 3.

Now, a configuration of phosphor wheel 1A according to Embodiment 3 will be described with reference to FIG. 17 and FIG. 18. FIG. 17 is an exploded perspective view of phosphor wheel 1A according to Embodiment 3. FIG. 18 is a side view of phosphor wheel 1A according to Embodiment 3. Elements that are similar to those illustrated in FIG. 1, FIG. 2, and so on are given identical reference characters, and detailed description thereof will be omitted.

As illustrated in FIG. 17 and FIG. 18, phosphor wheel 1A includes substrate 11, phosphor layer 12 provided on substrate 11, heat dissipating member 30K, motor 40, and adjusting plate 41A. In other words, phosphor wheel 1A illustrated in FIG. 17 and so on differs from phosphor wheel 1 according to Embodiment 1 or Embodiment 2 in terms of mainly the configuration of heat dissipating member 30K. In this example, adjusting plate 41A is used to adjust any shift in the center of gravity that may arise during rotation so as to transmit rotary power of motor 40 to substrate 11 and so on in a well-balanced manner but is not an essential component. As with adjusting plate 41, adjusting plate 41A may be a hub of motor 40. The following description centers on the differences from Embodiment 1 or Embodiment 2.

[Heat Dissipating Member 30K]

Heat dissipating member 30K is a plate-like member. Heat dissipating member 30K is disposed so as to oppose either one of the first principal surface and the second principal surface of substrate 11 and rotated along with substrate 11. In the example illustrated in FIG. 17 and FIG. 18, heat dissipating member 30K is disposed so as to oppose the second principal surface of substrate 11. In this example, phosphor layer 12 is provided on the first principal surface of substrate 11.

Figure 19:
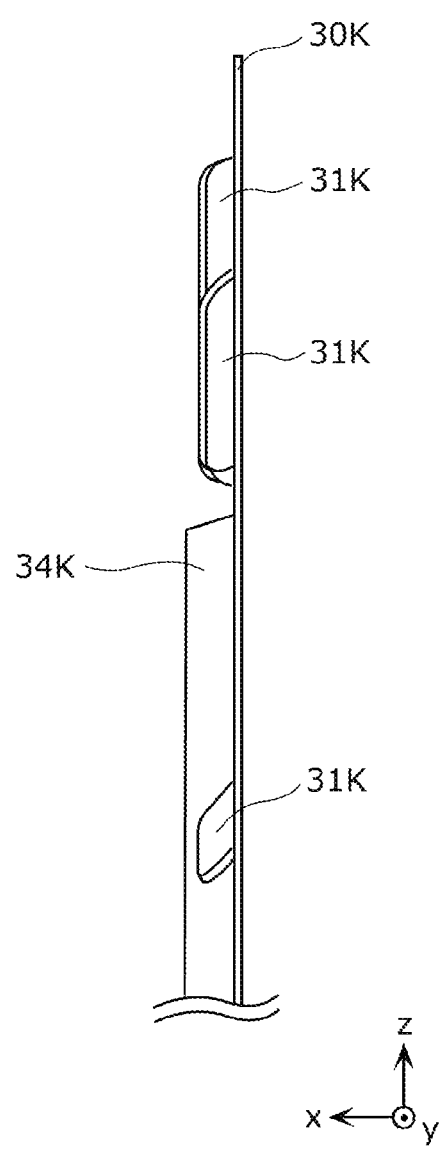
FIG. 19 is an enlarged side view of a heat dissipating member illustrated in FIG. 18.
Figure 20:
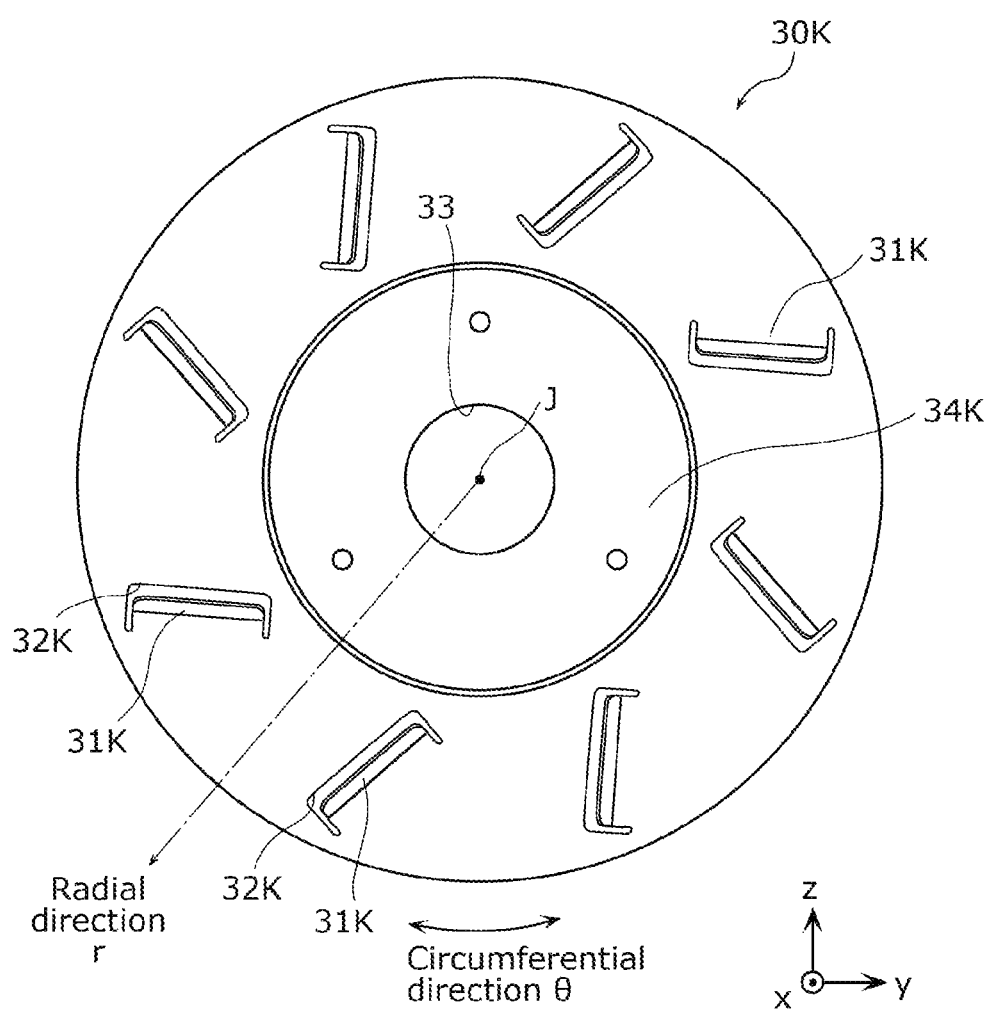
FIG. 20 is a front view of the heat dissipating member according to Embodiment 3, as viewed toward the first principal surface.
Figure 21:
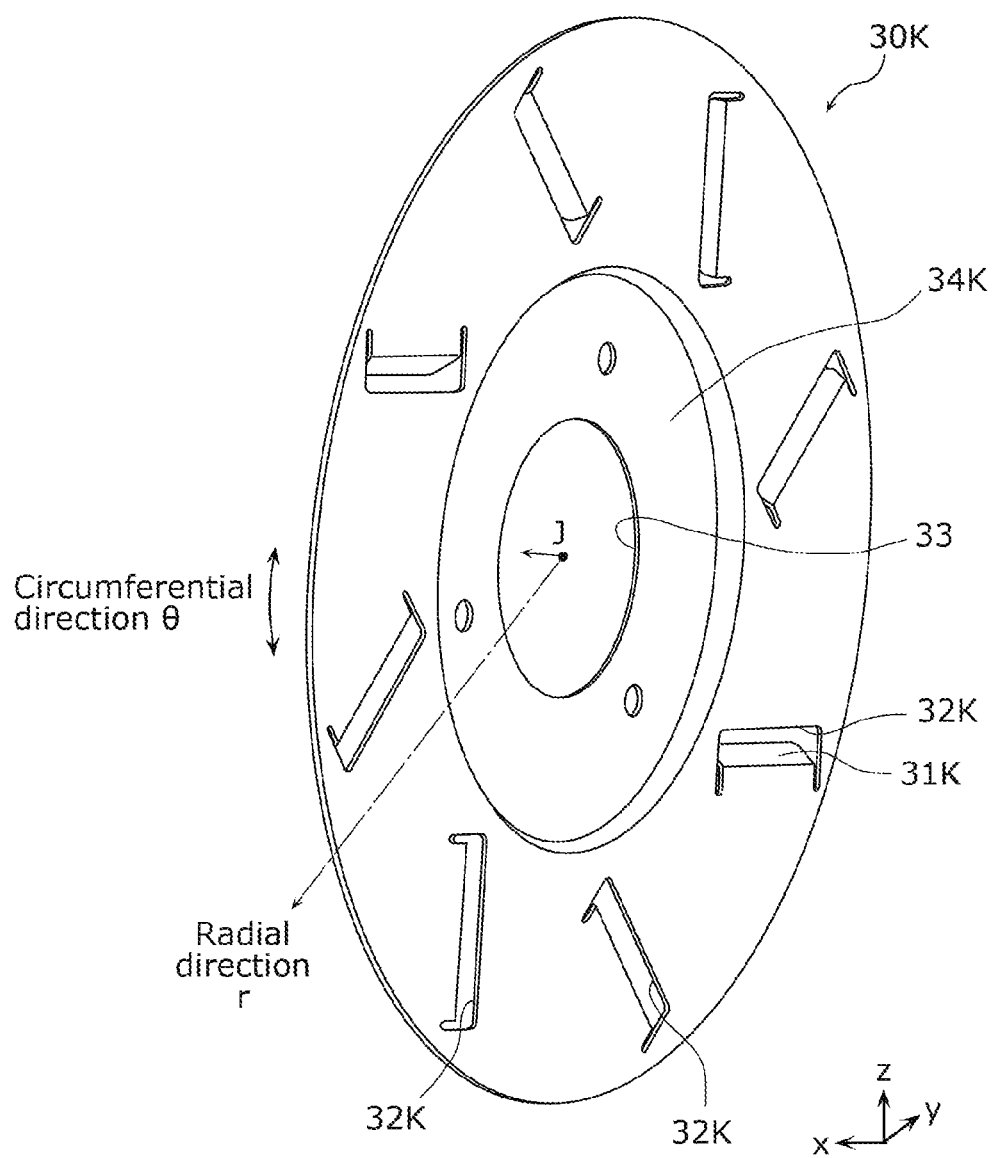
FIG. 21 is a perspective view of the heat dissipating member according to Embodiment 3, as viewed toward the second principal surface.

FIG. 19 is an enlarged side view of heat dissipating member 30K illustrated in FIG. 18. FIG. 20 is a front view of heat dissipating member 30K according to Embodiment 3, as viewed toward the first principal surface. FIG. 21 is a rear perspective view of heat dissipating member 30K according to Embodiment 3, as viewed toward the second principal surface. In this case, as described above, a rear side is the surface of heat dissipating member 30K that is opposite to its other surface (the front surface) facing the second principal surface of substrate 11 and that is visible when heat dissipating member 30K is viewed in the direction perpendicular to heat dissipating member 30K (i.e., viewed from the negative side on the X-axis).

Heat dissipating member 30K is a disc-shaped plate-like member that is driven by motor 40 so as to rotate about axis of rotation J. In other words, heat dissipating member 30K has a circular shape as viewed in plan view. In this example, heat dissipating member 30K has a diameter of about 7 cm, for example, or may have a diameter of from about 3 cm to about 100 cm. In a case where heat dissipating member 30K is disposed so as to oppose the first principal surface of substrate 11 as will be described later, there is no particular limitation on the diameter of heat dissipating member 30K as long as this diameter is smaller than the inner diameter of phosphor layer 12. In other words, in a case where heat dissipating member 30K is disposed so as to oppose the first principal surface of substrate 11, it suffices that the diameter of heat dissipating member 30K be smaller than the inner diameter of phosphor layer 12 that is provided in an annular belt shape on one of the surfaces of substrate 11. Meanwhile, in a case where heat dissipating member 30K is disposed so as to oppose the second principal surface of substrate 11, as illustrated in FIG. 17, the diameter of heat dissipating member 30K may be smaller than the diameter of substrate 11 and greater than the inner diameter of phosphor layer 12 or may be smaller than the diameter of substrate 11.

According to the present embodiment, as illustrated in FIG. 17 to FIG. 21, heat dissipating member 30K includes a plurality of fins 31K and projecting portion 34K serving as a component implementing the function of clearance retaining members 20. For example, according to the present embodiment, as illustrated in FIG. 17 and FIG. 18, heat dissipating member 30K is disposed so as to oppose the second principal surface of substrate 11. The plurality of fins 31K are cut and raised toward the second principal surface of substrate 11, and projecting portion 34K also projects toward the second principal surface of substrate 11. Now, projecting portion 34K, the plurality of fins 31K, and so on will be described in detail.

<Projecting Portion 34K>

Projecting portion 34K is provided at the center portion of heat dissipating member 30K so as to project toward either one of the first principal surface and the second principal surface of substrate 11. Projecting portion 34K includes a contact surface that makes contact with this either one of the first principal surface and the second principal surface. Projecting portion 34K makes contact with substrate 11 via the contact surface, and thus projecting portion 34K secures a certain distance between substrate 11 and heat dissipating member 30K and conducts the heat in substrate 11 to a peripheral region of heat dissipating member 30K excluding the center portion of heat dissipating member 30K.

According to the present embodiment, as illustrated in FIG. 18, for example, projecting portion 34K is provided at the center portion of heat dissipating member 30K so as to project toward the second principal surface of substrate 11 in order to secure the distance between substrate 11 and heat dissipating member 30K constant. Projecting portion 34K is formed through drawing.

As illustrated in FIG. 18 and FIG. 19, it suffices that the thickness of projecting portion 34K, that is, the distance between substrate 11 and heat dissipating member 30K be no smaller than the height of the plurality of fins 31K formed by cutting and raising a peripheral region of heat dissipating member 30K described later. For example, as illustrated in FIG. 20 and FIG. 21, projecting portion 34K includes an annular belt-shaped contact surface that is to make contact with the second principal surface of substrate 11.

Opening 33 is provided at the center of projecting portion 34K and allows motor 40 and adjusting plate 41A to be connected to each other via opening 33. With this configuration, axis of rotation J passes through the center (the center position) of heat dissipating member 30K, and heat dissipating member 30K, along with substrate 11, is driven by motor 40 so as to rotate about axis of rotation J. It suffices that opening 33 have a size (a diameter) that is sufficient to allow a part of motor 40 that is to be connected to adjusting plate 41A to pass therethrough. For example, it suffices that opening 33 have a size that allows a gap of a maximum of 1 mm to be present between the edge of opening 33 and the part of motor 40.

Projecting portion 34K has a diameter of, for example, about 3.7 cm, but this is not a limiting example. It suffices that the diameter of projecting portion 34K be smaller than the inner diameter of heat dissipating member 30K, and there is no particular limitation on the diameter of projecting portion 34K as long as this diameter is greater than the diameter of opening 33.

In this manner, as illustrated in FIG. 17 to FIG. 21, projecting portion 34K is provided at the center portion of heat dissipating member 30K so as to include the annular belt-shaped contact surface. With this configuration, projecting portion 34K functions not only as a spacer that can form an air gap (a space) filled with air of a certain distance between substrate 11 and the peripheral region of heat dissipating member 30K but also as a path for thermal conduction via which the heat produced in phosphor layer 12 can be transmitted from substrate 11 to the peripheral region of heat dissipating member 30K.

<Fins 31K>

The plurality of fins 31K are formed through a cutting and raising process. To be more specific, the plurality of fins 31K are formed by cutting and raising a plurality of regions 32K located in the peripheral region in the plate-like member of heat dissipating member 30K excluding its center portion. The plurality of fins 31K are each cut and raised toward either one of the first principal surface and the second principal surface of substrate 11. According to the present embodiment, as illustrated in FIG. 17 to FIG. 19, the plurality of fins 31K are erected toward the second principal surface of substrate 11 as the plurality of regions 32K are cut and raised toward the second principal surface of substrate 11.

In addition, as illustrated in FIG. 18 and FIG. 19, the height of the plurality of fins 31K is smaller than the thickness of projecting portion 34K.

In the example illustrated in FIG. 17 and FIG. 18, each fin 31K is formed in the peripheral region within the region of heat dissipating member 30K that corresponds to the region inward from the inner diameter of phosphor layer 12, but this is not a limiting example. In a case where heat dissipating member 30K is disposed so as to oppose the first principal surface of substrate 11 and where the diameter of heat dissipating member 30K is greater than the inner diameter of phosphor layer 12, each fin 31K may be formed in the peripheral region including the region in heat dissipating member 30K that corresponds to the region of phosphor layer 12. Moreover, in a case where heat dissipating member 30K is disposed so as to oppose the first principal surface of substrate 11 and where the diameter of heat dissipating member 30K is greater than the inner diameter of phosphor layer 12, each fin 31K may be formed in the peripheral region including the region in heat dissipating member 30K that corresponds to the region outward from the outer diameter of phosphor layer 12.

For example, as illustrated in FIG. 20 and FIG. 21, the plurality of fins 31K are disposed annularly in circumferential direction θ at a certain distance from the center (axis of rotation J) in the peripheral region of heat dissipating member 30K. For example, the plurality of fins 31K each have a substantially rectangular shape (a substantially trapezoidal shape), and the corners at their leading end portions may each be cut off to a round shape. In other words, as in the example illustrated in FIG. 20 and FIG. 21, the plurality of fins 31K are each formed so as to extend at a certain angle relative to radial direction r in the peripheral region and are each cut and raised so as to extend at a certain angle relative to the second principal surface of substrate 11 (or relative to the front surface of the heat dissipating member). In this example, it suffices that the plurality of fins 31K be each formed in the peripheral region, and the plurality of fins 31K do not have to be formed to align with radial direction r. Moreover, the plurality of fins 31K do not have to be erected perpendicular to the second principal surface of substrate 11 (or to the front surface of heat dissipating member 30K).

<Regions 32K>

As in Embodiment 1 and Embodiment 2, regions 32K are partial regions in the peripheral region of heat dissipating member 30K and serve as through-holes after the plurality of fins 31K have been formed.

To be more specific, the plurality of regions 32K are located in the peripheral region. Moreover, as illustrated in FIG. 20, as viewed from the direction extending from substrate 11 toward heat dissipating member 30K (as viewed toward the first principal surface), the plurality of regions 32K are located at positions along respective virtual straight lines that each extend at a predetermined angle or greater relative to the radial direction from positions that are spaced apart from the center of heat dissipating member 30K by a predetermined distance and lie at substantially regular intervals in circumferential direction θ. The plurality of regions 32K may be similar in shape or may not be similar in shape.

As in Embodiment 1 and Embodiment 2, the plurality of regions 32K serve as through-holes penetrating through heat dissipating member 30K and function as vent holes through which the wind produced by the plurality of fins 31K passes. As illustrated in FIG. 20, the plurality of regions 32K are located annularly in circumferential direction θ within the peripheral region and lie at a certain distance from the center of heat dissipating member 30K (axis of rotation J). If the plurality of regions 32K are disposed randomly, this makes the rotation of heat dissipating member 30K unstable, causing strange sounds or the like. Therefore, the plurality of regions 32K are disposed at substantially regular intervals.

For example, the plurality of regions 32K each have a substantially rectangular shape (a substantially trapezoidal shape), and their corners may each be cut off to a round shape.

As illustrated in FIG. 20, the plurality of regions 32K are each formed so as to extend at a certain angle relative to radial direction r. In this example, the plurality of regions 32K do not have to be formed to align with radial direction r. It suffices that the size of the angle of the plurality of regions 32K relative to radial direction r be determined such that the plurality of cut and raised fins 31K can send the wind effectively to the outer side, and the example illustrated in FIG. 20 is not a limiting example.

[Advantageous Effects and Others]

As described above, phosphor wheel 1A according to the present embodiment includes substrate 11, phosphor layer 12, and heat dissipating member 30K. Substrate 11 includes the first principal surface and the second principal surface located opposite to each other. Phosphor layer 12 is provided on the first principal surface. Heat dissipating member 30K is that is a plate-like member. Heat dissipating member 30K is disposed so as to oppose the second principal surface of substrate 11 and rotated along with substrate 11. Heat dissipating member 30K includes a projecting portion and a plurality of fins. The projecting portion is provided at the center portion of heat dissipating member 30K so as to project toward the second principal surface and includes a contact surface that makes contact with the second principal surface. The plurality of fins are formed by cutting and raising a plurality of regions in a peripheral region excluding the center portion. As projecting portion 34K makes contact with substrate 11 via the contact surface, projecting portion 34K can secure a certain distance between substrate 11 and heat dissipating member 30K and conduct the heat in substrate 11 to the peripheral region of heat dissipating member 30K.

In this manner, phosphor wheel 1A according to the present embodiment is also a reflective phosphor wheel and includes phosphor layer 12 only on the first principal surface of substrate 11. Moreover, phosphor wheel 1A includes heat dissipating member 30K provided with projecting portion 34K, and this can create a space of a certain distance between substrate 11 and heat dissipating member 30K. With this configuration, the wind produced by the plurality of fins 31K can be sent toward the outside of the space between substrate 11 and heat dissipating member 30K via the plurality of regions 32K (the through-holes). In other words, the wind produced by the plurality of fins 31K can be used to cool phosphor layer 12. Accordingly, the heat dissipation performance of phosphor wheel 1A can be improved. Moreover, as substrate 11 and projecting portion 34K make contact with each other, phosphor wheel 1A can create a path for thermal conduction of transmitting the heat produced in phosphor layer 12 from substrate 11 to the peripheral region of heat dissipating member 30K. Thus, the heat dissipation performance can be further improved.

With the configuration described above, phosphor wheel 1A with more improved heat dissipation performance can be achieved.

Furthermore, as compared to Embodiment 1 and Embodiment 2, since phosphor wheel 1A does not include the plurality of clearance retaining members 20, the number of sources that produce wind noise can be reduced, and thus wind noise can be suppressed. In other words, according to the present embodiment, the heat dissipation performance of phosphor wheel 1A can be improved, and the wind noise to be produced by the plurality of fins 31K can be suppressed at the same time.

Moreover, phosphor wheel 1A includes heat dissipating member 30K provided with projecting portion 34K, and this renders the plurality of clearance retaining members 20 unnecessary. Thus, the number of components can be reduced, and the cost can be reduced in turn.

In phosphor wheel 1A according to the present embodiment, in order to further reduce the level of noise to be produced when phosphor wheel 1A is rotated and driven, phosphor wheel 1A may be used while being housed in a chassis called a house. In this case, since the influence of the inner structure of the house is small, the noise level can be reduced in phosphor wheel 1A according to the present embodiment. Now, this will be described with reference to a comparative example.

Figure 22A:
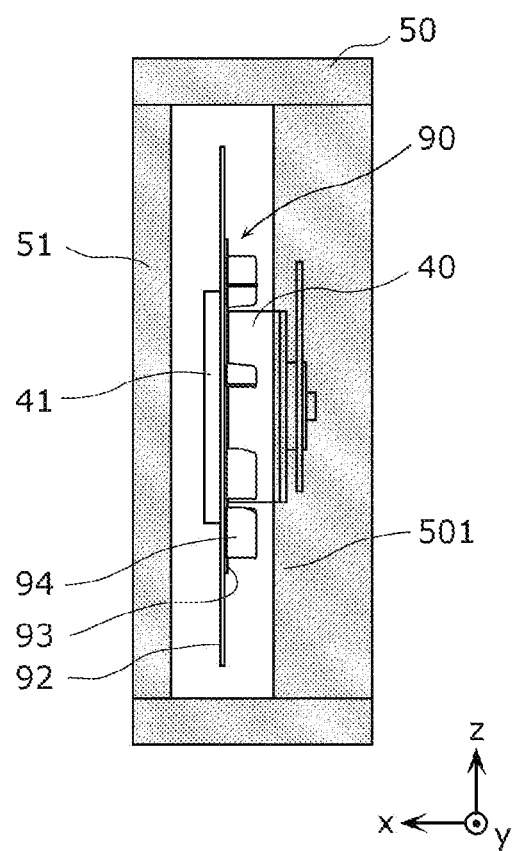
FIG. 22A is an illustration showing how a phosphor wheel according to a comparative example is housed in a house.
Figure 22B:
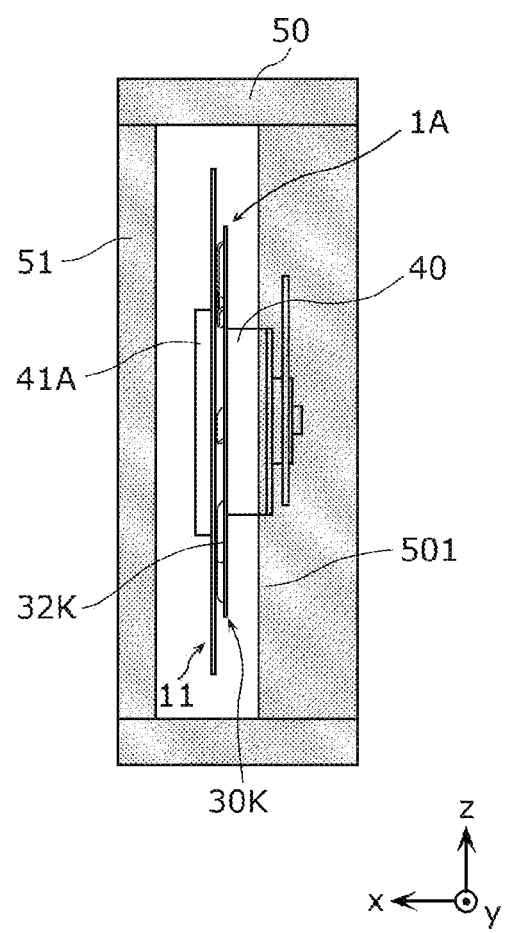
FIG. 22B is an illustration showing how the phosphor wheel according to Embodiment 3 is housed in a house.
Figure 22C:
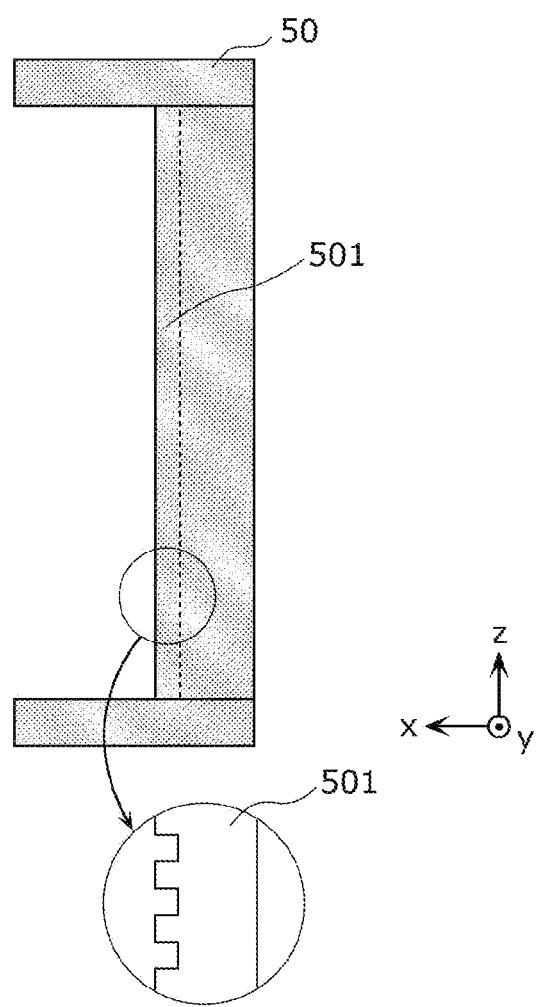
FIG. 22C is an illustration for describing an inner structure of the house illustrated in FIG. 22A and FIG. 22B.

FIG. 22A is an illustration showing how phosphor wheel 90 according to a comparative example is housed in house 50. FIG. 22B is an illustration showing how phosphor wheel 1A according to the present embodiment is housed in house 50. FIG. 22C is an illustration for describing the inner structure of house 50 illustrated in FIG. 22A and FIG. 22B. Elements that are similar to those illustrated in FIG. 1, FIG. 17, and so on are given identical reference characters, and detailed description thereof will be omitted.

House 50 is a chassis that forms a tightly closed space upon being closed by lid 51. When a phosphor wheel is to be housed in house 50, the number of paths for conducting the heat from the phosphor wheel to the outside needs to be increased. Therefore, as illustrated in FIG. 22C, for example, in one conceivable case, a concave and convex structure is formed in inner wall 501 of house 50 to increase the paths for heat conduction.

In phosphor wheel 90 according to the comparative example illustrated in FIG. 22A, heat dissipating member 93 is attached to a rear surface of substrate 92 (the surface on the negative side on the X-axis direction), and a plurality of fins 94 are erected on heat dissipating member 93. In other words, as can be seen from phosphor wheel 90 according to the comparative example, in a typical structure, fins 94 for heat dissipation rise toward inner wall 501 of house 50. Therefore, it is speculated that, when phosphor wheel 90 according to the comparative example is housed in house 50, the pressure swing on inner wall 501 is large. This is because the wind produced by fins 94 fluctuates as exposed fins 94 rise toward inner wall 501.

In contrast, as illustrated in FIG. 22B, in phosphor wheel 1A according to the present embodiment, heat dissipating member 30K is located between substrate 11 and inner wall 501, and the wind produced by fins 31K can be blocked. Therefore, it is speculated that the pressure swing on inner wall 501 is relatively small. The magnitude of the pressure swing on inner wall 501 has a large impact on the magnitude of the noise level. Therefore, in phosphor wheel 1A according to the present embodiment, an influence associated with the inner structure of the house is small, and thus the noise level is expected to be reduced.

Furthermore, as compared to phosphor wheel 90 according to the comparative example, phosphor wheel 1A according to the present embodiment includes fins 31K of a small height, and thus the size of house 50 can be advantageously reduced as well.

Figure 23:
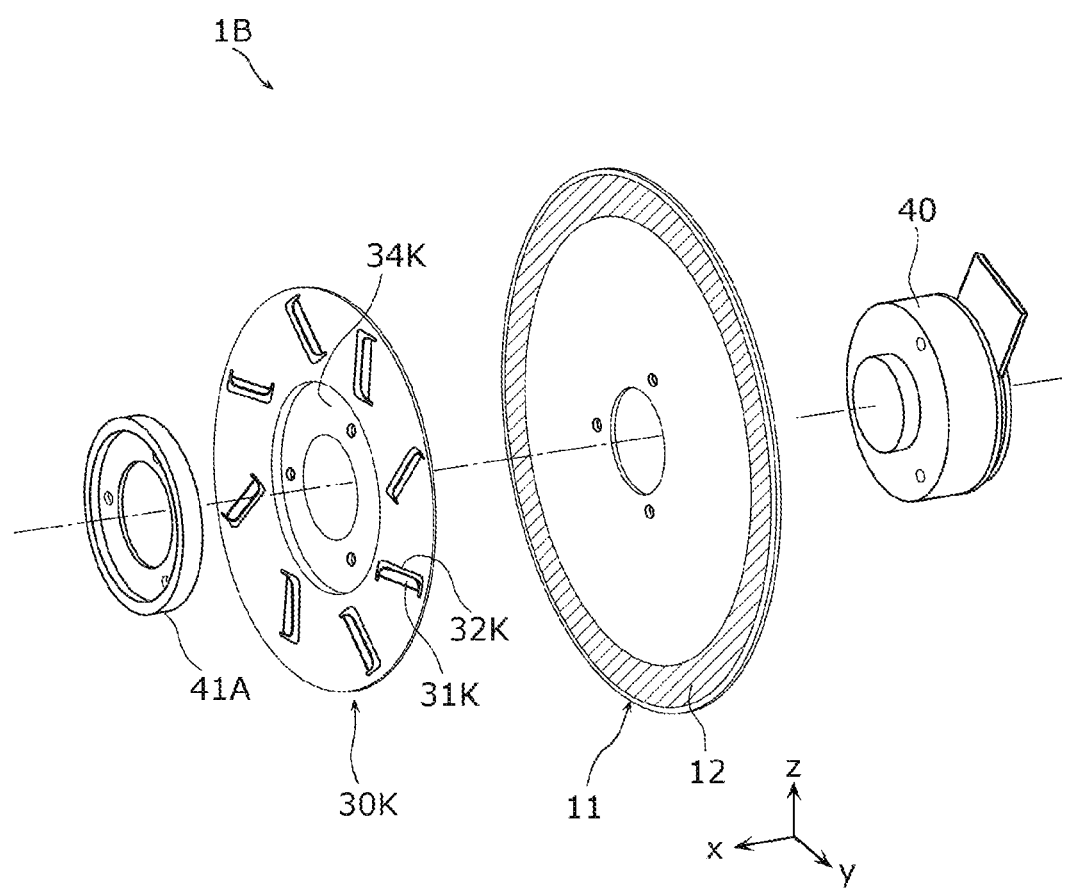
FIG. 23 is an exploded perspective view of a phosphor wheel according to another aspect of Embodiment 3.

In the example described according to Embodiment 3, as can be seen from FIG. 17 and FIG. 18, heat dissipating member 30K constituting phosphor wheel 1A is disposed so as to oppose the second principal surface of substrate 11, but this is not a limiting example. FIG. 23 is an exploded perspective view of phosphor wheel 1B according to another aspect of Embodiment 3. Specifically, as in phosphor wheel 1B illustrated in FIG. 23, heat dissipating member 30K may be disposed so as to oppose the first principal surface of substrate 11 on which phosphor layer 12 is provided. In this case, the plurality of fins 31K may be cut and raised toward the first principal surface of substrate 11, and projecting portion 34K may be formed so as to project toward the first principal surface of substrate 11. Furthermore, in this case, without providing projecting portion 34K on heat dissipating member 30K, adjusting plate 41A may also fill the function of projecting portion 34K. Moreover, heat dissipating member 30K and adjusting plate 41A filling the function of projecting portion 34K may be integrated into one unit. This configuration can further reduce the number of components and reduce the cost in turn.

[Variation 1]

According to Embodiment 3 described above, the configuration for suppressing wind noise and the configuration for improving the heat dissipation performance are not limited to the examples described above. Substrate 11 may be configured as described according to Variation 1 to Variation 3 of Embodiment 1.

To be more specific, substrate 11 included in phosphor wheel 1A may include one or more substrate-side fins 14A formed by cutting and raising a part of a region where phosphor layer 12 is not provided, as illustrated in FIG. 7. In this case, each substrate-side fin 14A may be formed by cutting region 15A that is a partial region in the plate-like member of substrate 11 constituting phosphor wheel 1A and where phosphor layer 12 is not provided and by raising cut region 15A toward one of the surfaces of heat dissipating member 30 where heat dissipating member 30 opposes the second principal surface. In addition, one or more substrate-side fins 14A and one or more fins 31 formed in heat dissipating member 30 may be formed at positions where one or more substrate-side fins 14A and one or more fins 31 do not overlap each other as viewed in the direction in which substrate 11A and heat dissipating member 30 overlap each other.

Moreover, substrate 11 included in phosphor wheel 1A may include a plurality of apertures 16B formed for ventilation in a region where phosphor layer 12 is not provided, as illustrated in FIG. 8. In this case, as viewed in the direction from substrate 11B to heat dissipating member 30K (as viewed toward the first principal surface), the plurality of apertures 16B may be formed along respective virtual lines that each extend in a curved or a straight line at a predetermined angle or greater relative to radial direction r from positions that are spaced apart from the center of substrate 11B by a predetermined distance and lie at substantially regular intervals in circumferential direction θ.

Moreover, substrate 11 included in phosphor wheel 1A may include a plurality of openings 17C formed for ventilation in a region where phosphor layer 12 is not provided, as illustrated in FIG. 9. In this case, as viewed in the direction from substrate 11C to heat dissipating member 30K (as viewed toward the first principal surface), the plurality of openings 17C may be formed along respective virtual lines that each extend in a curved or a straight line at a predetermined angle or greater relative to radial direction r from positions that are spaced apart from the center of substrate 11C by a predetermined distance and lie at substantially regular intervals in circumferential direction θ.

[Variation 2]

According to Embodiment 3 described above, the configuration for suppressing wind noise and the configuration for improving the heat dissipation performance are not limited to the examples described above. Heat dissipating member 30K may be configured as described according to Embodiment 2 and Variation 1 to Variation 4.

To be more specific, phosphor wheel 1A may include heat dissipating member 30F in place of heat dissipating member 30K. In other words, as illustrated in FIG. 12, for example, the plurality of fins 31F formed in heat dissipating member 30F included in phosphor wheel 1A may each be split into two parts by slit 312F provided at the center portion.

Moreover, phosphor wheel 1A may include heat dissipating member 30G in place of heat dissipating member 30K. In other words, as illustrated in FIG. 13, for example, the plurality of fins 31G formed in heat dissipating member 30G included in phosphor wheel 1A may each be split into two parts by a space provided at the position corresponding to the position where the bent shape of each region 32G is bent. In this case, the resulting two parts of each fin 31G may be cut and raised at different angles relative to the radial direction of heat dissipating member 30G. In this example, the plurality of regions 32G are similar in shape and each have a bent shape. As viewed in the direction from substrate 11 toward heat dissipating member 30G (as viewed toward the first principal surface), the plurality of regions 32G may be located at positions that are spaced apart from the center of heat dissipating member 30G by a predetermined distance and lie at substantially regular intervals in circumferential direction θ.

Moreover, phosphor wheel 1A may include, in place of heat dissipating member 30K, heat dissipating member 30H provided with the plurality of fins 31H. In other words, as illustrated in FIG. 14, for example, leading end portion 315H of each of the plurality of fins 31H may be cut and raised at an angle different from the angle at which portion 314H of each of the plurality of fins 31H other than leading end portion 315H is cut and raised, and as cut and raised at this angle, leading end portion 315H is oriented, more than portion 314H is, toward one of the surfaces of heat dissipating member 30H where heat dissipating member 30H opposes the second principal surface.

Moreover, phosphor wheel 1A may include, in place of heat dissipating member 30K, heat dissipating member 30I provided with the plurality of fins 31. In other words, as illustrated in FIG. 15, for example, the plurality of fins 31 may each be provided further with the plurality of holes 317I. In this example, heat dissipating member 30I may further include opening 33 formed for ventilation at the center portion of heat dissipating member 30I. In this case, it suffices that the axis of rotation of heat dissipating member 30I to be rotated along with substrate 11 pass through opening 33.

Moreover, phosphor wheel 1A may include heat dissipating member 30J in place of heat dissipating member 30K. In this case, as illustrated in FIG. 16, it suffices that connecting the outer peripheral ends of the plurality of regions formed in heat dissipating member 30J yield two or more outlines of different diameters. If suffices that the plurality of regions be located apart from each other in the circumferential direction of heat dissipating member 30J, as viewed in the direction in which substrate 11 and heat dissipating member 30J overlap each other.

In this example, any adjacent two of the plurality of regions have different lengths in the longitudinal direction, as viewed in the direction in which substrate 11 and heat dissipating member 30J overlap each other. Moreover, the length of each of the plurality of regions in the longitudinal direction may be either the first length or the second length that is shorter than first length. The length of one of the two adjacent regions may be the first length, whereas the length of the other of the two adjacent regions may be the second length.

[Variation 3]

In the cases described according to Variation 3 and Variation 4, in order to suppress wind noise, a shape element (a wind deflecting shape) for reducing the air resistance by applying the knowledge of biomimetics is further added to the shape of each of the plurality of fins described above according to Embodiment 3.

According to Variation 3 below, an example in which a shape element of a thin sharp wing of an albatross is added to the shape of each fin will be described as an example of a biomimetic application of the plan-view shape of a bird's wing.

Figure 24:
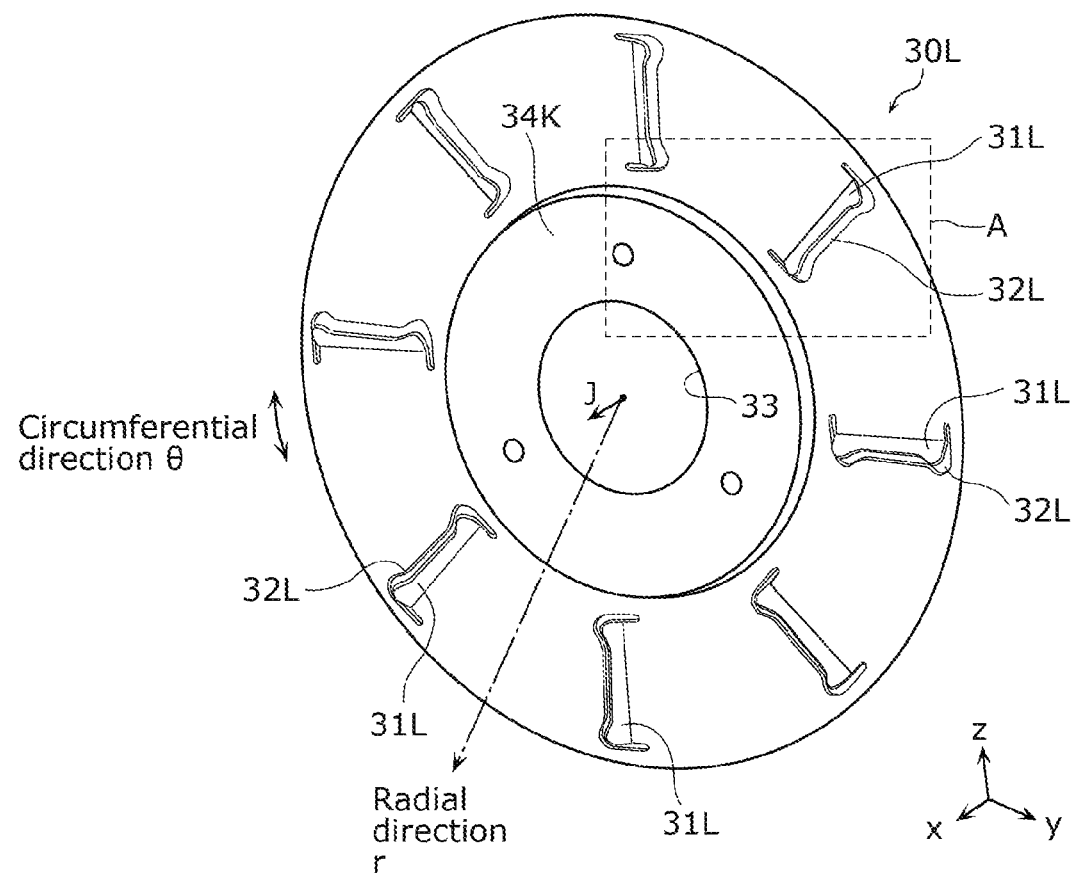
FIG. 24 is a perspective view of a heat dissipating member according to Variation 3 of Embodiment 3, as viewed toward the adjusting plate.
Figure 25:
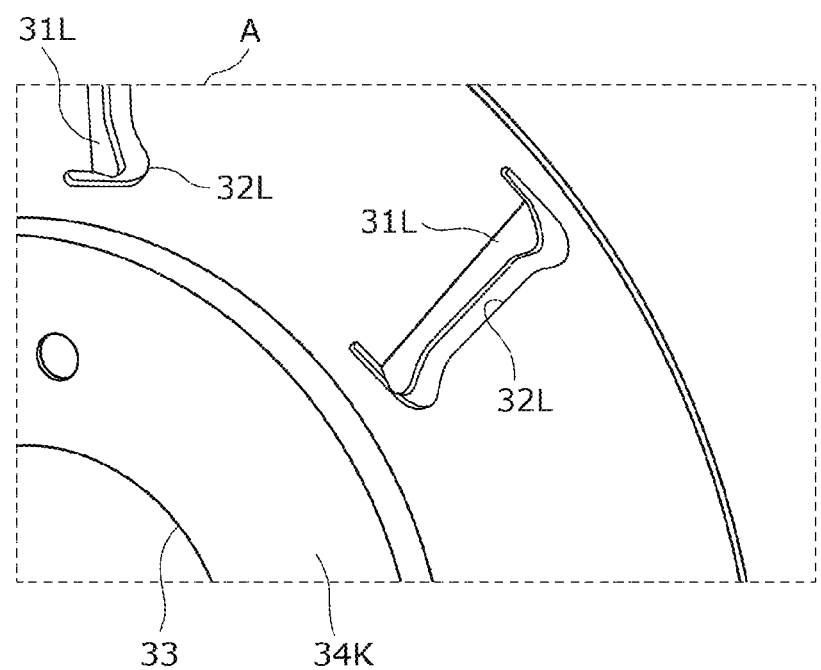
FIG. 25 is an enlarged view of region A indicated in FIG. 24.

FIG. 24 is a perspective view of heat dissipating member 30L according to Variation 3 of Embodiment 3, as viewed toward adjusting plate 41 (i.e., from the positive side on the X-axis). FIG. 25 is an enlarged view of region A indicated in FIG. 24. Elements that are similar to those illustrated in FIG. 20, FIG. 21, and so on are given identical reference characters, and detailed description thereof will be omitted.

Heat dissipating member 30L illustrated in FIG. 24 differs from heat dissipating member 30K illustrated in FIG. 20 and FIG. 21 in terms of the shape of a plurality of fins 31L and the shape of a plurality of regions 32L. The following description centers on the differences from heat dissipating member 30K described above.

[Heat Dissipating Member 30L]

As with heat dissipating member 30K according to Embodiment 3, heat dissipating member 30L is a plate-like member. Heat dissipating member 30L is disposed so as to oppose either one of the first principal surface and the second principal surface of substrate 11 and rotated along with substrate 11. In addition, as illustrated in FIG. 24, heat dissipating member 30L includes the plurality of fins 31L and projecting portion 34K.

<Fins 31L>

The plurality of fins 31L according to the present variation are formed through a cutting and raising process. In addition, the plurality of fins 31L are each formed so as to include at least one recessed portion at its end portion. To be more specific, as illustrated in FIG. 24 and FIG. 25, the plurality of fins 31L are each formed so as to further include a recessed portion provided at the end portion of each of the plurality of fins 31K illustrated in FIG. 20 and FIG. 21. The plurality of fins 31L are each formed so as to have an area that is substantially the same as the area of each of the plurality of fins 31K. In other words, the height (the length) of each of the plurality of fins 31L from heat dissipating member 30L is greater than the height (the length) of each of the plurality of fins 31K except at the recessed portion.

According to the present embodiment, as illustrated in FIG. 24 and FIG. 25, the plurality of fins 31L are erected toward the second principal surface of substrate 11 as the plurality of regions 32L are cut and raised toward the second principal surface of substrate 11. In addition, the plurality of fins 31L each have a shape in which the recessed portion is further formed in the end portion of each of the plurality of fins 31K, that is, in the end portion of the substantially rectangular part (the substantially trapezoidal part) of each of the plurality of fins 31K. This recessed portion is formed so as to be sloping, and the length of each fin 31 at the recessed portion decreases along the slope.

In this example, the recessed portion in each of the plurality of fins 31L is formed into a shape that mimics the shape element of a thin sharp wing of an albatross (a wind deflecting shape).

Figure 26:
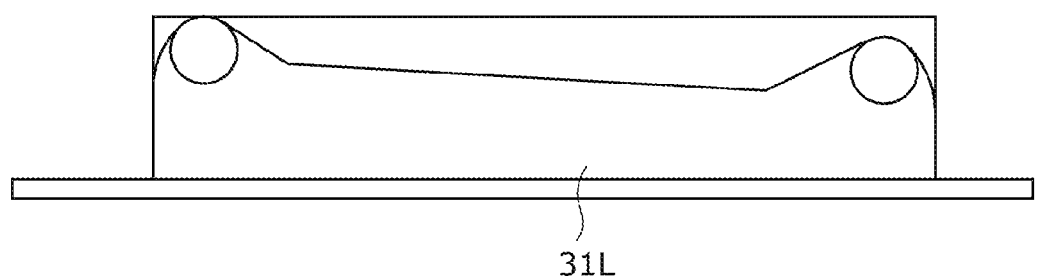
FIG. 26 is an illustration showing an example of a plan-view shape of a fin according to Variation 3 of Embodiment 3.

FIG. 26 is an illustration showing an example of a plan-view shape of fin 31L according to Variation 3 of Embodiment 3.

Each fin 31L is a plate-like member, and this makes it difficult to create the shape of fin 31L that exactly reflects the shape of a wing of an albatross. Therefore, according to the present variation, as illustrated in FIG. 26, by mimicking the shape element of a wing of an albatross, a sloping recessed portion is formed at a portion that becomes an upper end portion when fin 31L is cut and raised, and thus fin 31L is processed into a shape in which the length from the lower end to the upper end of fin 31L decreases along the slope. The shape of fin 31L illustrated in FIG. 26 is an example of a shape achieved through the process. In other words, with the shape element of a thin sharp wing of an albatross regarded as a shape that is tapered gradually toward one end, a sloping recessed is formed in fin 31K as in the example illustrated in FIG. 26, and thus the shape of fin 31L in which the length from the lower end to the upper end gradually decreases is achieved.

<Regions 32L>

Regions 32L are partial regions in the peripheral region of heat dissipating member 30L and serve as through-holes after the plurality of fins 31L have been formed. The shape of each of the plurality of regions 32L is substantially identical to the shape of its corresponding fin 31L. Features other than the above are similar to those of the plurality of regions 32K, and thus description thereof will be omitted.

[Advantageous Effects and Others]

According to the present variation, as with the plurality of fins 31K described above, the plurality of fins 31L are formed by cutting and raising a plurality of regions in the peripheral region of heat dissipating member 30L excluding its center portion. The plurality of fins 31L formed in heat dissipating member 30L are each formed so as to include at least one recessed portion at its end portion. Moreover, this recessed portion is formed so as to be sloping, and the length of each fin at the recessed portion decreases along the slope.

With this configuration, each of the plurality of fins 31L can further suppress wind noise.

The flow of air is disrupted when an object moves, and an air spiral that varies every moment is produced behind the object. Then, the force caused by this air spiral acts on the object, and its reaction force then acts on the air. Hence, conceivably a sound is produced. Therefore, it is highly likely that the sound produced in response to the movement of an object can be suppressed by reducing the air spiral and by suppressing the disruption of the air (a spiral disruption).

Meanwhile, an albatross is known to have the highest aerodonetic force among all the birds and have wings suitable for flying a long distance. An albatross has a wing that has a (thin sharp) plan-view shape with a high aspect ratio for suppressing the induced drag during gliding. In view of the above, it is highly likely that an albatross's wings produce less air spiral during gliding and that the disruption of the air is small.

Therefore, when the shape of each of the plurality of fins 31L is formed into the shape that mimics the shape element of a wing of a bird, such as an albatross, the air spiral produced as the plurality of fins 31L are rotated along with heat dissipating member 30L may possibly be reduced, or the disruption of the air spiral may possibly be reduced.

Accordingly, for example, phosphor wheel 1A provided with the plurality of fins 31L was fabricated, and its noise performance was measured. In this example, the plurality of fins 31L each had an area substantially equal to the area of each of the plurality of fins 31K. The result obtained through the measurement indicated that phosphor wheel 1A provided with the plurality of fins 31L had higher noise performance than phosphor wheel 1A provided with the plurality of fins 31K.

This has revealed that the wind noise can be further suppressed with phosphor wheel 1A provided with the plurality of fins 31L, in which the plurality of fins 31L are each formed into a shape (a wind deflecting shape) that mimics the shape element of a wing of a bird, such as an albatross.

In the foregoing description, the plurality of fins 31L each include a recessed portion located at its upper end portion, but this is not a limiting example. The plurality of fins 31L may each include a recessed portion such as the one described above at its left end portion and/or its right end portion.

[Variation 4]

Now, according to Variation 4, an example in which a shape element of a wing of a chestnut tiger is added to the shape of each fin will be described as an example of a biomimetic application of the plan-view shape of a butterfly's wing.

Figure 27:
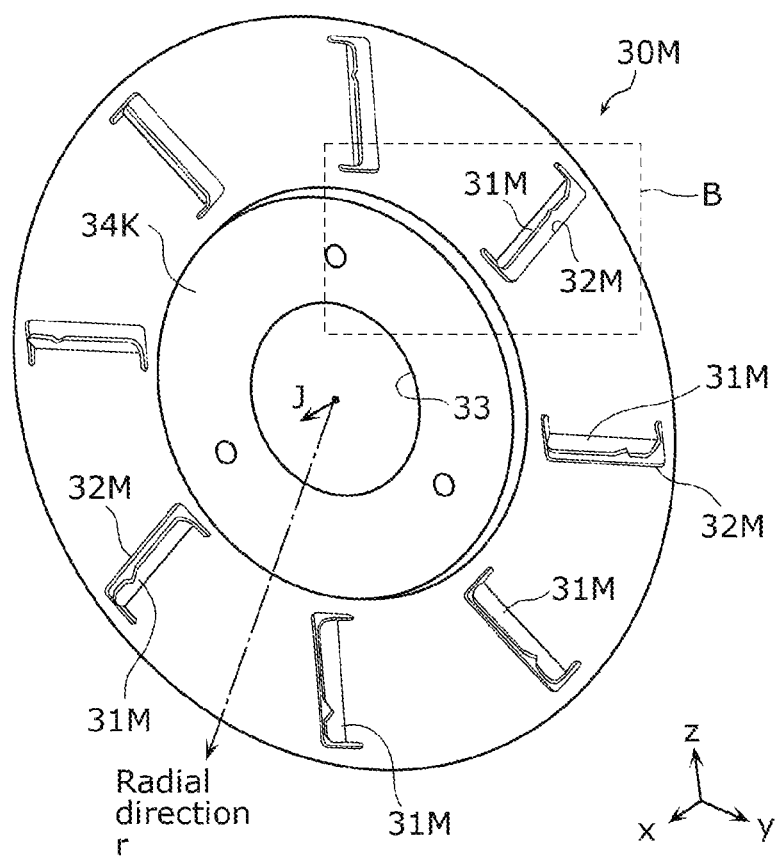
FIG. 27 is a perspective view of a heat dissipating member according to Variation 4 of Embodiment 3, as viewed toward the adjusting plate.
Figure 28:
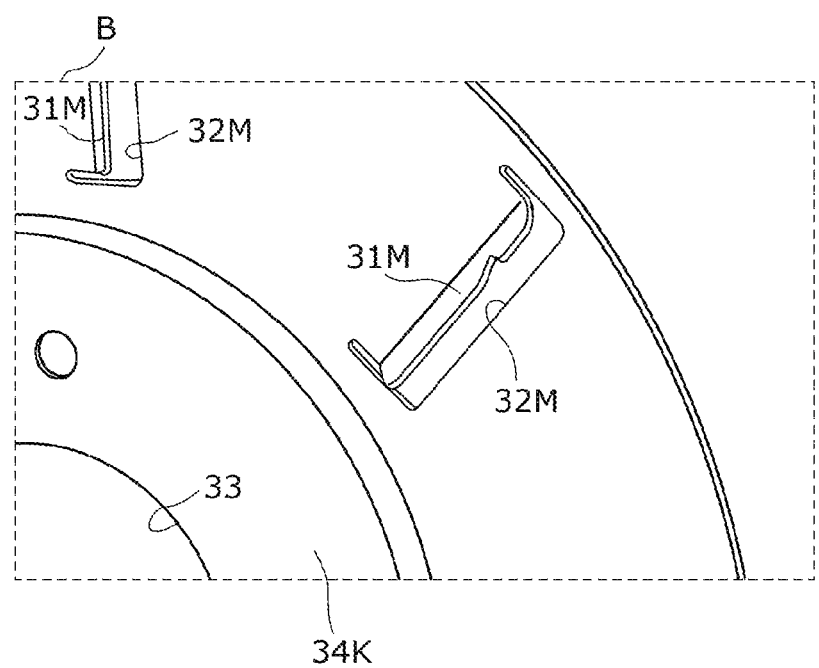
FIG. 28 is an enlarged view of region B indicated in FIG. 27.

FIG. 27 is a perspective view of heat dissipating member 30M according to Variation 4 of Embodiment 3, as viewed toward adjusting plate 41 (i.e., from the positive side on the X-axis). FIG. 28 is an enlarged view of region B indicated in FIG. 27. Elements that are similar to those illustrated in FIG. 20, FIG. 21, and so on are given identical reference characters, and detailed description thereof will be omitted.

Heat dissipating member 30M illustrated in FIG. 27 differs from heat dissipating member 30K illustrated in FIG. 20 and FIG. 21 in terms of the shape of a plurality of fins 31M and the shape of a plurality of regions 32M. The following description centers on the differences from heat dissipating member 30K described above.

[Heat Dissipating Member 30M]

As with heat dissipating member 30K according to Embodiment 3, heat dissipating member 30M is a plate-like member. Heat dissipating member 30M is disposed so as to oppose either one of the first principal surface and the second principal surface of substrate 11 and rotated along with substrate 11. In addition, as illustrated in FIG. 27, heat dissipating member 30M includes the plurality of fins 31M and projecting portion 34K.

<Fins 31M>

The plurality of fins 31M according to the present variation are formed through a cutting and raising process. In addition, the plurality of fins 31M are each formed so as to include at least one recessed portion at its end portion. To be more specific, as illustrated in FIG. 27 and FIG. 28, the plurality of fins 31M are each formed so as to further include a recessed portion provided at the end portion of each of the plurality of fins 31K illustrated in FIG. 20 and FIG. 21. The plurality of fins 31M are each formed so as to have an area smaller than the area of each of the plurality of fins 31K.

According to the present variation, as illustrated in FIG. 27 and FIG. 28, the plurality of fins 31M are erected toward the second principal surface of substrate 11 as the plurality of regions 32M are cut and raised toward the second principal surface of substrate 11. In addition, the plurality of fins 31M each have a shape in which the recessed portion is further formed in the end portion of each of the plurality of fins 31K, that is, in the end portion of the substantially rectangular part (the substantially trapezoidal part) of each of the plurality of fins 31K. This recessed portion is formed at a position offset in one of the two ends from the center of the end portion.

In this example, the recessed portion in each of the plurality of fins 31M is formed into a shape that mimics the shape element of a wing of a butterfly called a chestnut tiger (a wind deflecting shape).

Figure 29:
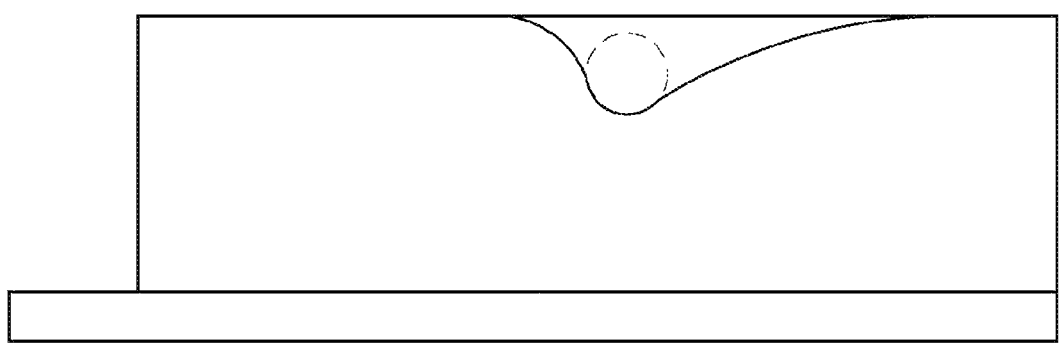
FIG. 29 is an illustration showing an example of a plan-view shape of a fin according to Variation 4 of Embodiment 3.

FIG. 29 is an illustration showing an example of a plan-view shape of fin 31M according to Variation 4 of Embodiment 3.

Each fin 31M is a plate-like member, and this makes it difficult to create the shape of fin 31M that exactly reflects the shape of a wing of a chestnut tiger. Therefore, according to the present variation, as illustrated in FIG. 28, by mimicking the shape element of a chestnut tiger's wing, a recessed portion is formed at a portion that becomes an upper end portion when fin 31M is cut and raised, and thus fin 31M is processed into a shape that includes a narrow part near the center of the upper end of fin 31M. The shape of fin 31M illustrated in FIG. 29 is an example of a shape achieved through the process. In other words, with the shape element of a wing of a chestnut tiger regarded as a shape with a narrow part provided near the center, when a recessed portion is formed at a position offset toward the right end of fin 31K from the center of fin 31K as in the example illustrated in FIG. 29, the shape of fin 31M having a narrow part near the center is achieved.

<Regions 32M>

Regions 32M are partial regions in the peripheral region of heat dissipating member 30M and serve as through-holes after the plurality of fins 31M have been formed. The shape of each of the plurality of regions 32M is substantially identical to the shape of its corresponding fin 31M. Features other than the above are similar to those of the plurality of regions 32K, and thus description thereof will be omitted.

[Advantageous Effects and Others]

According to the present variation, as with the plurality of fins 31K described above, the plurality of fins 31M are formed by cutting and raising a plurality of regions in the peripheral region of heat dissipating member 30M excluding its center portion. The plurality of fins 31M formed in heat dissipating member 30M are each formed so as to include at least one recessed portion at its end portion. In addition, the recessed portion is formed at a position offset toward one (i.e., the right or left end) of the two ends from the center of the end portion.

With this configuration, each of the plurality of fins 31M can further suppress wind noise.

A chestnut tiger is known to fly a distance even long enough to cross an ocean without flapping the wings that much. Although the flying performance of chestnut tigers has not yet been made clear, a chestnut tiger has a wing of a plan-view shape with a unique narrow part near the center. In view of the above, it is highly likely that a chestnut tiger's wing produces less air spiral while flying and that the disruption of the air is small.

Therefore, when the shape of each of the plurality of fins 31M is formed into a shape that mimics the shape element of a wing of a butterfly, such as a chestnut tiger, the air spiral produced as the plurality of fins 31M are rotated along with heat dissipating member 30M may possibly be reduced, or the disruption of the air spiral may possibly be reduced.

Accordingly, for example, phosphor wheel 1A provided with the plurality of fins 31M was fabricated, and its noise performance was measured. The result obtained through the measurement indicated that phosphor wheel 1A provided with the plurality of fins 31M had noise performance substantially equivalent to that of phosphor wheel 1A provided with the plurality of fins 31K. In this example, the plurality of fins 31M each have an area smaller than the area of each of the plurality of fins 31K.

With this taken into consideration, it has been found that the wind noise can be further suppressed with phosphor wheel 1A provided with the plurality of fins 31M when the plurality of fins 31M are each formed into a shape (a wind deflecting shape) that mimics the shape element of a wing of a butterfly, such as a chestnut tiger.

In the foregoing description, the plurality of fins 31M each include a recessed portion at its upper end portion, but this is not a limiting example. The plurality of fins 31M may each include a recessed portion such as the one described above at its left end portion and/or its right end portion.

ADDITIONAL EMBODIMENTS AND OTHERS

The embodiments and the variations described above are merely examples, and it is needless to say that various changes, additions, omission, and so on can be made.

In addition, an embodiment obtained by combining, as desired, the constituent elements and the functions illustrated in the embodiments and the variations described above is also encompassed by the scope of the present disclosure. Moreover, an embodiment obtained by making various modifications that a person skilled in the art can conceive of to the embodiments and the variations described above or an embodiment achieved by combining, as desired, the constituent elements and the functions of the embodiments described above within the scope that does not depart from the spirit of the present disclosure is also encompassed by the present disclosure. For example, a new embodiment can be conceived of by combining the constituent elements described in the foregoing embodiments and variations.

Moreover, the constituent elements illustrated in the appended drawings and in the detailed description may include not only the constituent elements that are essential for solving the problem but also the constituent elements that are merely for illustrating the technique and are not essential for solving the problem. Hence, that these constituent elements that are not essential are illustrated in the appended drawings and in the detailed description should not immediately give any admission that these non-essential constituent elements are essential.

Furthermore, the present disclosure also includes a light source device or a laser projector constituted by phosphor wheel 1 such as the one described below.

Specifically, the present disclosure includes a light source device that includes phosphor wheel 1 illustrated in the embodiments and the variations described above; a pump light source, such as a laser light source; and an optical system that guides emission light from the pump light source to phosphor wheel 1. Moreover, the present disclosure also includes a projection-type video display device that includes phosphor wheel 1 illustrated in the embodiments and the variations described above; a motor that rotates phosphor wheel 1; a laser light source that irradiates a phosphor layer with laser light; an optical modulation element that modulates, into a video signal, light emitted from the phosphor layer in response to the laser light received from the laser light source; and a projection lens that projects the light modulated by the optical modulation element.

INDUSTRIAL APPLICABILITY

The phosphor wheel according to the present disclosure can be applied, as a reflective phosphor wheel, to a projection-type video display device or a light source or the like for a laser projector, an illumination device for facilities, or an endoscope.

The invention claimed is:
1. A phosphor wheel comprising:
   a substrate including a first principal surface and a second principal surface located opposite to each other;
   a phosphor layer provided on the first principal surface; and
   a heat dissipating member that is a plate-like member, the heat dissipating member disposed so as to oppose one of the first principal surface and the second principal surface and rotated along with the substrate, wherein:
   the heat dissipating member includes:
      a projecting portion projecting from a center portion of the heat dissipating member toward the one of the first principal surface and the second principal surface, the projecting portion including a contact surface that makes contact with the one of the first principle surface and the second principle surface;
      a plurality of fins formed by cutting and raising a plurality of regions in a peripheral region of the heat dissipating member excluding the center portion; and
      through-holes that are formed by cutting and raising the plurality of regions and penetrate the heat dissipating member in a direction perpendicular to the substrate,
   the projecting portion makes contact with the substrate via the contact surface so as to secure a certain distance between the substrate and the heat dissipating member and conduct heat in the substrate to the peripheral region of the heat dissipating member,
   the substrate further includes one or more substrate-side fins formed by cutting and raising a part of a region of the substrate where the phosphor layer is not provided,
   the one or more substrate-side fins are each cut and raised toward one surface of the heat dissipating member, the one surface opposing the second principal surface, and
   the one or more substrate-side fins and the one or more fins formed in the heat dissipating member are formed at positions that do not overlap each other, as viewed in a direction in which the substrate and the heat dissipating member overlap each other.

2. The phosphor wheel according to claim 1, wherein the plurality of fins are each cut and raised toward the one of the first principal surface and the second principal surface.

3. The phosphor wheel according to claim 2, wherein at least one recessed portion is formed in an end portion of each of the plurality of fins.

4. The phosphor wheel according to claim 3, wherein the at least one recessed portion is formed at a position offset toward one of two ends from a center of the end portion.

5. The phosphor wheel according to claim 3, wherein the at least one recessed portion is formed so as to be sloping, and
a length of each of the plurality of fins at the at least one recessed portion decreases along the sloping.

6. The phosphor wheel according to claim 1, wherein the phosphor layer is provided in an annular belt shape on one surface of the substrate, and
the heat dissipating member has a diameter smaller than an inner diameter of the phosphor layer.

7. The phosphor wheel according to claim 1, wherein the plurality of regions are similar in shape and are located along virtual straight lines that each extend at a predetermined angle or greater relative to a radial direction from respective positions that are spaced apart from a center of the heat dissipating member by a predetermined distance and lie at substantially regular intervals in a circumferential direction, as viewed in a direction from the substrate toward the heat dissipating member.

8. The phosphor wheel according to claim 1, wherein the plurality of fins are each split into two parts by a slit provided at a center portion of the fin.

9. The phosphor wheel according to claim 1, wherein
the plurality of regions are similar in shape and each have a bent shape, the plurality of regions located at respective positions that are spaced apart from a center of the heat dissipating member by a predetermined distance and lie at substantially regular intervals in a circumferential direction, as viewed in a direction from the substrate toward the heat dissipating member,
the plurality of fins are each split into two parts by a space provided at a position corresponding to a position where the bent shape is bent, and
the two parts of each of the plurality of fins are cut and raised at different angles relative to a radial direction of the heat dissipating member.

10. The phosphor wheel according to claim 1, wherein
the plurality of regions are located apart from each other in a circumferential direction of the heat dissipating member, as viewed in a direction in which the substrate and the heat dissipating member overlap each other, and
connecting outer peripheral ends of the plurality of regions yields two or more outlines of different diameters.

11. The phosphor wheel according to claim 1, wherein
adjacent regions among the plurality of regions have different lengths in a longitudinal direction, as viewed in a direction in which the substrate and the heat dissipating member overlap each other.

12. The phosphor wheel according to claim 11, wherein
a length of each of the plurality of regions in the longitudinal direction is a first length or a second length shorter than the first length,
the length of one of the adjacent regions in the longitudinal direction is the first length, and
the length of an other of the adjacent regions in the longitudinal direction is the second length.

13. The phosphor wheel according to claim 1, wherein
a leading end portion of each of the plurality of fins is cut and raised at a first angle different from a second angle at which a remaining portion other than the leading end portion of the fin is cut and raised, and
the first angle orients the leading end portion such that the leading end portion is inclined toward one surface of the heat dissipating member more than the remaining portion is, the one surface opposing the second principal surface.

14. The phosphor wheel according to claim 1, wherein a plurality of holes are formed in each of the plurality of fins.

15. The phosphor wheel according to claim 1, wherein
the heat dissipating member includes an opening formed for ventilation at a center of the heat dissipating member, and
an axis of rotation of the heat dissipating member that is to be rotated along with the substrate passes through the opening.

16. The phosphor wheel according to claim 1, wherein
the substrate further includes a plurality of apertures formed for ventilation in a region of the substrate where the phosphor layer is not provided, and
the plurality of apertures are formed along virtual lines that each extend in a curved or a straight line at a predetermined angle or greater relative to a radial direction from respective positions that are spaced apart from a center of the substrate by a predetermined distance and lie at substantially regular intervals in a circumferential direction, as viewed in a direction from the substrate toward the heat dissipating member.

17. The phosphor wheel according to claim 1, wherein
the substrate further includes a plurality of openings formed for ventilation in a region of the substrate where the phosphor layer is not provided, and
the plurality of openings are formed along respective virtual lines that each extend in a curved or a straight line at a predetermined angle or greater relative to a radial direction from respective positions that are spaced apart from a center of the substrate by a predetermined distance and lie at substantially regular intervals in a circumferential direction, as viewed in a direction from the substrate toward the heat dissipating member.

18. The phosphor wheel according to claim 1, wherein
the substrate is disc-shaped, and
the phosphor layer is formed in a belt shape along a circumferential direction of the substrate.

19. A phosphor wheel comprising:
a substrate including a first principal surface and a second principal surface located opposite to each other;
a phosphor layer provided on the first principal surface;
a heat dissipating member that is a plate-like member, the heat dissipating member disposed so as to oppose the second principal surface and rotated along with the substrate; and
one or more clearance retaining members for securing a certain distance between the substrate and the heat dissipating member, wherein:
the heat dissipating member includes:
    a plurality of fins formed by cutting and raising a plurality of regions in the plate-like member; and
    through-holes that are formed by cutting and raising the plurality of regions and penetrate the heat dissipating member in a direction perpendicular to the substrate,
the plurality of fins are each cut and raised toward the second principal surface,
the one or more clearance retaining members each make contact with the substrate and the heat dissipating member so as to conduct heat in the substrate to the heat dissipating member,
the substrate further includes one or more substrate-side fins formed by cutting and raising a part of a region of the substrate where the phosphor layer is not provided,
the one or more substrate-side fins are each cut and raised toward one surface of the heat dissipating member, the one surface opposing the second principal surface, and
the one or more substrate-side fins and the one or more fins formed in the heat dissipating member are formed at positions that do not overlap each other, as viewed in a direction in which the substrate and the heat dissipating member overlap each other.

20. The phosphor wheel according to claim 19, wherein
the one or more clearance retaining members are disposed along an outline having a predetermined radius from a center of the substrate, as viewed in a direction in which the substrate and the heat dissipating member overlap each other.

21. A phosphor wheel comprising:
a substrate including a first principal surface and a second principal surface located opposite to each other;
a phosphor layer provided on the first principal surface;
a heat dissipating member that is a plate-like member, the heat dissipating member disposed so as to oppose the second principal surface and rotated along with the substrate; and one or more clearance retaining members for securing a certain distance between the substrate and the heat dissipating member, wherein:

the heat dissipating member includes a plurality of fins formed by cutting and raising a plurality of regions in the plate-like member, the plurality of fins are each cut and raised toward the second principal surface, the one or more clearance retaining members each make contact with the substrate and the heat dissipating member so as to conduct heat in the substrate to the heat dissipating member, and the one or more clearance retaining members are each disposed in one of two or more outlines of different diameters and do not overlap one another in a radial direction, as viewed in a direction in which the substrate and the heat dissipating member overlap each other.

22. A phosphor wheel comprising:

a substrate including a first principal surface and a second principal surface located opposite to each other;

a phosphor layer provided on the first principal surface;

a heat dissipating member that is a plate-like member, the heat dissipating member disposed so as to oppose the second principal surface and rotated along with the substrate; and one or more clearance retaining members for securing a certain distance between the substrate and the heat dissipating member, wherein:

the heat dissipating member includes a plurality of fins formed by cutting and raising a plurality of regions in the plate-like member, the plurality of fins are each cut and raised toward the second principal surface, the one or more clearance retaining members each make contact with the substrate and the heat dissipating member so as to conduct heat in the substrate to the heat dissipating member, the one or more clearance retaining members are disposed along an outline having a predetermined radius from a center of the substrate, as viewed in a direction in which the substrate and the heat dissipating member overlap each other, and a plurality of slits or a plurality of punch holes are formed in each of the one or more clearance retaining members, as viewed in a direction perpendicular to the direction in which the substrate and the heat dissipating member overlap each other.

* * * * *